US011321235B2

(12) United States Patent
Joo

(10) Patent No.: US 11,321,235 B2
(45) Date of Patent: May 3, 2022

(54) CACHE MEMORY DEVICE, SYSTEM INCLUDING THE SAME, AND METHOD OF OPERATING THE SAME

(71) Applicant: SAMSUNG ELECTRONICS CO., LTD., Suwon-si (KR)

(72) Inventor: Hyunwook Joo, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/000,875

(22) Filed: Aug. 24, 2020

(65) Prior Publication Data

US 2021/0240631 A1    Aug. 5, 2021

(30) Foreign Application Priority Data

Jan. 30, 2020 (KR) ........................ 10-2020-0010921

(51) Int. Cl.
| G06F 12/00 | (2006.01) |
| G06F 12/0895 | (2016.01) |
| G06F 12/0891 | (2016.01) |
| G06F 9/30 | (2018.01) |
| G06F 12/14 | (2006.01) |
| G06F 12/128 | (2016.01) |

(52) U.S. Cl.
CPC ...... *G06F 12/0895* (2013.01); *G06F 9/30047* (2013.01); *G06F 9/30101* (2013.01); *G06F 12/0891* (2013.01); *G06F 12/1441* (2013.01); G06F 12/128 (2013.01); G06F 2212/1021 (2013.01)

(58) Field of Classification Search
CPC ............ G06F 12/0895; G06F 9/30047; G06F 9/30101; G06F 12/0891; G06F 12/1441; G06F 12/128; G06F 2212/1021
See application file for complete search history.

(56) References Cited

U.S. PATENT DOCUMENTS

| 6,425,055 B1 | 7/2002 | Sager et al. |
| 7,594,079 B2 | 9/2009 | Yu et al. |
| 7,650,465 B2 | 1/2010 | Knoth et al. |

(Continued)

FOREIGN PATENT DOCUMENTS

JP    2011-257800    12/2011

*Primary Examiner* — Gurtej Bansal
(74) *Attorney, Agent, or Firm* — F. Chau & Associates, LLC

(57) ABSTRACT

A cache memory device includes a cache circuit and a way prediction circuit. The cache circuit generates a cache hit signal indicating whether target data corresponding to an access address are stored in cache lines and performs a current cache access operation primarily with respect to candidate ways based on a candidate way signal indicating the candidate ways in a way prediction mode. The way prediction circuit stores accumulation information by accumulating a cache hit result indicating whether the target data are stored in one of ways and a way prediction hit result indicating whether the target data are stored in one of the candidate ways based on the cache hit signal provided during previous cache access operations. The way prediction circuit generates the candidate way signal by determining the candidate ways for the current cache access operation based on the accumulation information in the way prediction mode.

20 Claims, 19 Drawing Sheets

(56) References Cited

U.S. PATENT DOCUMENTS

| | | |
|---|---|---|
| 9,367,468 B2 | 6/2016 | Sassone et al. |
| 9,864,694 B2 | 1/2018 | Dooley et al. |
| 2006/0090034 A1 | 4/2006 | Ishihara et al. |
| 2011/0072215 A1 | 3/2011 | Takahashi |
| 2014/0181407 A1* | 6/2014 | Crum .................. G06F 12/0895 711/128 |
| 2017/0357588 A1 | 12/2017 | Moyer |
| 2018/0330259 A1* | 11/2018 | Liu ....................... G06F 9/3806 |

* cited by examiner

FIG. 12

WRB

| SET | PR1 | PR2 | PR3 | ... | PRk |
|---|---|---|---|---|---|
| 0 | $3_1$ | $2_4$ | $12_1$ | ... | $11_3$ |
| 1 | $10_1$ | $8_0$ | 14 | ... | $5_2$ |
| ⋮ | · | ⋮ | ⋮ | ⋱ | ⋮ |
| m | $3_3$ | $9_3$ | $14_3$ | ... | $6_2$ |

FIG. 13

AIB

| ENTRY | ADDRESS | PIDa | PIDv | DI | RU |
|---|---|---|---|---|---|
| 1 | AD1 | 0 | 0 | 0 | 0 |
| 2 | AD2 | 3 | 1 | 1 | 1 |
| 3 | AD3 | 3 | 2 | 1 | 0 |
| ⋮ | ⋮ | ⋮ | ⋮ | ⋮ | ⋮ |
| q | ADq | 3 | 3 | 0 | 0 |

FIG. 14

COI

| SET | WY0 | WY1 | WY2 | ... | WYk |
|---|---|---|---|---|---|
| 0 | 1 | 3 | 1 | ... | 1 |
| 1 | 0 | 1 | 0 | ... | 2 |
| ⋮ | ⋮ | ⋮ | . | ⋱ | ⋮ |
| m | 2 | 2 | 1 | ... | 2 |

FIG. 16

| SET | PRC0<br>WPW0 | PRC1<br>WPW1 | | PRCn<br>WPWn |
|---|---|---|---|---|
| 0 | 4 | 1 | ... | 3 |
| 1 | 0 | 1 | | 5 |
| ⋮ | | | | |
| m | 1 | 8 | | 0 |

FIG. 18

DDR

PCR0

| SET | P1 | P2 | P3 | P4 | ... | Ps |
|-----|----|----|----|----|-----|----|
| 0 | 11 | 11 | 11 | 10 | ... | 11 |
| 1 | 10 | 10 | 10 | 00 | ... | 10 |
| . | . | : | : | : | ⋱ | : |
| m | 00 | 00 | 10 | 00 | ... | 10 |

WRB

| SET | PR1 | PR2 | PR3 | ... | PRk |
|-----|-----|-----|-----|-----|-----|
| 0 | 3 | 2 | 12 | .. | 11 |
| 1 | 10 | 8 | 1 | ... | 5 |
| : | : | : | : | ⋱ | : |
| m | 3 | 9 | 14 | ... | 6 |

CACHE MEMORY DEVICE, SYSTEM INCLUDING THE SAME, AND METHOD OF OPERATING THE SAME

CROSS-REFERENCE TO RELATED APPLICATION

This U.S. non-provisional application claims priority under 35 U.S.C. § 119 to Korean Patent Application No. 10-2020-0010921, filed on Jan. 30, 2020 in the Korean Intellectual Property Office (KIPO), the disclosure of which is incorporated by reference herein in its entirety.

TECHNICAL FIELD

Exemplary embodiments of the inventive concept relate generally to semiconductor integrated circuits, and more particularly, to a cache memory device, a system including the cache memory device, and a method of operating the cache memory device.

DISCUSSION OF RELATED ART

Accessing a cache memory device of a processor consumes a significant amount of power. The cache memory device includes a data array having a plurality of sets such that each set includes a plurality of cache lines (e.g., storage locations). The cache memory device also includes a plurality of ways such that each way includes a driver corresponding to the plurality of cache lines. In response to an instruction to access data stored in the cache memory device, all of the drivers corresponding to the plurality of ways are enabled (e.g., activated) to drive a particular set of the data array to a multiplexer.

In parallel (e.g., concurrently) with all of the drivers being enabled, a tag lookup operation is performed, to identify a particular cache line within the data array. Based on a result of the tag lookup operation, data provided via a single driver (corresponding to a single cache line) is selected as an output of the multiplexer. Driving all of the ways for a set and performing the tag lookup operation may cause inefficient power consumption given that data from only a single cache line is output based on the instruction.

SUMMARY

According to an exemplary embodiment of the inventive concept, a cache memory device includes a cache circuit and a way prediction circuit. The cache circuit includes a plurality of ways and each of the plurality of ways includes a plurality of cache lines corresponding to a plurality of sets. The cache circuit generates a cache hit signal indicating whether target data corresponding to an access address are stored in the plurality of cache lines and performs a current cache access operation with respect to candidate ways among the plurality of ways based on a candidate way signal indicating the candidate ways in a way prediction mode. The way prediction circuit stores accumulation information by accumulating a cache hit result indicating whether the target data are stored in one of the plurality of ways and a way prediction hit result indicating whether the target data are stored in one of the candidate ways based on the cache hit signal provided during a plurality of previous cache access operations. The way prediction circuit generates the candidate way signal by determining the candidate ways for the current cache access operation based on the accumulation information in the way prediction mode.

According to an exemplary embodiment of the inventive concept, a system includes one or more processors, a main memory device configured to store data used by the one or more processors, and a cache memory device configured to store a portion of the data stored in the main memory and configured to be accessed by the one or more processors before the one or more processors access the main memory device. The cache memory device includes a cache circuit and a way prediction circuit. The cache circuit includes a plurality of ways and each of the plurality of ways includes a plurality of cache lines corresponding to a plurality of sets. The cache circuit generates a cache hit signal indicating whether target data corresponding to an access address are stored in the plurality of cache lines and performs a current cache access operation with respect to candidate ways among the plurality of ways based on a candidate way signal indicating the candidate ways in a way prediction mode. The way prediction circuit stores accumulation information by accumulating a cache hit result indicating whether the target data are stored in one of the plurality of ways and a way prediction hit result indicating whether the target data are stored in one of the candidate ways based on the cache hit signal provided during a plurality of previous cache access operations. The way prediction circuit generates the candidate way signal by determining the candidate ways for the current cache access operation based on the accumulation information in the way prediction mode.

According to an exemplary embodiment of the inventive concept, a method of operating a cache memory device including a plurality ways, each of the plurality of ways including a plurality of cache lines corresponding to a plurality of sets, includes, generating a cache hit signal indicating whether target data corresponding to an access address are stored in the plurality of cache lines, storing accumulation information by accumulating a cache hit result indicating whether the target data are stored in one of the plurality of ways and a way prediction hit result indicating whether the target data are stored in one of candidate ways based on the cache hit signal provided during a plurality of previous cache access operations, generating a candidate way signal by determining the candidate ways for a current cache access operation among the plurality of ways based on the accumulation information in a way prediction mode, and performing the current cache access operation with respect to the candidate ways among the plurality of ways based on the candidate way signal in the way prediction mode.

According to an exemplary embodiment of the inventive concept, a method of operating a cache memory device including a plurality ways, each of the plurality of ways including a plurality of cache lines corresponding to a plurality of sets, includes, receiving a prediction mode signal and a candidate way signal, determining whether the prediction mode signal indicates a way prediction mode, determining whether the candidate way signal includes candidate ways among the plurality of ways, performing a primary cache access operation with respect to the candidate ways, and determining whether a first cache hit signal for the primary cache access operation indicates a cache hit.

BRIEF DESCRIPTION OF THE DRAWINGS

The above and other features of the inventive concept will be more clearly understood by describing in detail exemplary embodiments thereof with reference to the accompanying drawings.

FIG. 12 is a diagram illustrating a way rank buffer included in a cache memory device according to an exemplary embodiment of the inventive concept.

FIG. 13 is a diagram illustrating an auxiliary inference buffer included in a cache memory device according to an exemplary embodiment of the inventive concept.

FIG. 14 is a diagram illustrating cache occupation information stored in a cache memory device according to an exemplary embodiment of the inventive concept.

FIG. 16 is a diagram illustrating way prediction windows stored in a cache memory device according to an exemplary embodiment of the inventive concept.

FIG. 18 is a diagram illustrating a differential diagnosis register included in a cache memory device according to an exemplary embodiment of the inventive concept.

FIG. 19 is a diagram illustrating a way rank buffer included in a cache memory device according to an exemplary embodiment of the inventive concept.

DETAILED DESCRIPTION OF THE EMBODIMENTS

Figure 1:
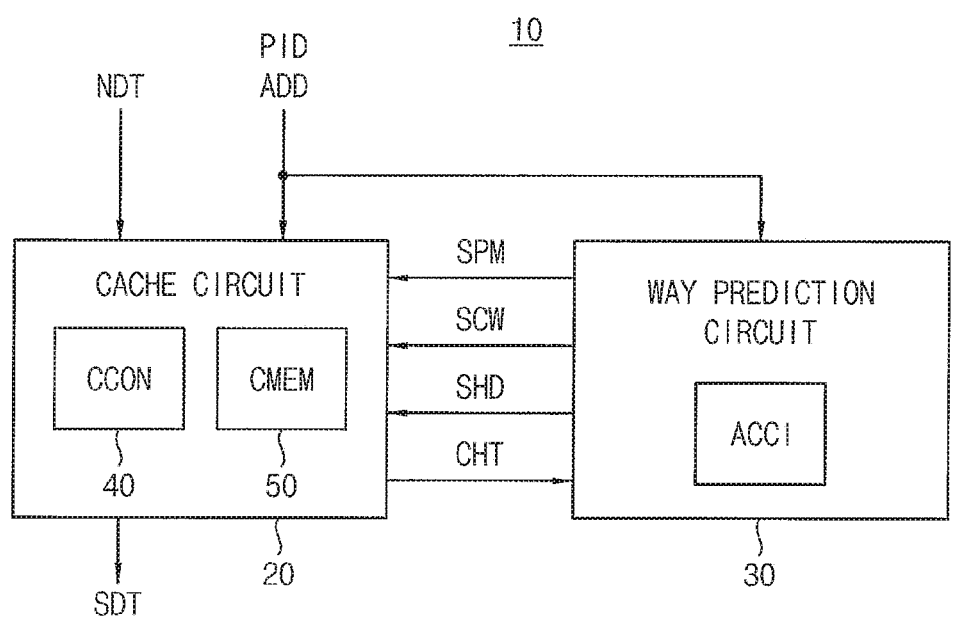
FIG. 1 is a block diagram illustrating a cache memory device according to an exemplary embodiment of the inventive concept.

Exemplary embodiments of the inventive concept provide a cache memory device, a system including the cache memory device, and a method of operating the cache memory device, capable of performing efficient way prediction.

Exemplary embodiments of the inventive concept will be described more fully hereinafter with reference to the accompanying drawings. Like reference numerals may refer to like elements throughout this application.

FIG. 1 is a block diagram illustrating a cache memory device according to an exemplary embodiment of the inventive concept.

Referring to FIG. 1, a cache memory device 10 may include a cache circuit 20 and a way prediction circuit 30.

The cache circuit 20 may include a cache memory CMEM 50 storing data and tags, and a cache controller CCON 40 controlling overall operations of the cache memory 50.

The cache circuit 20 may receive a processor identifier PID indicating a processor or a processor core related with a current cache access operation, an access address ADD related with the current cache access operation, and control signals or information SPM, SCW, and SHD provided from the way prediction circuit 30. The cache circuit 20 may generate a cache hit signal HCT based on the processor identifier PID, the access address ADD, and the control signals SPM, SCW, and SHD, where the cache hit signal HCT indicates whether target data SDT corresponding to the access address ADD are stored in the cache memory 50.

The cache circuit 20 may read and provide the target data SDT when the target data corresponding to the access address ADD are stored in the cache memory 50. The cache circuit 20 may store new data NDT in the cache memory 50 when the target data SDT corresponding to the access address ADD are not stored in the cache memory 50.

The cache memory 50 may have a set-associated cache structure including a plurality of ways such that each way includes a plurality cache lines corresponding to a plurality of sets. The set-associated cache structure will be described below with reference to FIG. 4.

The way prediction circuit 30 may receive the processor identifier PID, the access address ADD, and the cache hit signal CHT, and generate the control signals or information SPM, SCW, and SHD to control the cache circuit 20.

Figure 2:
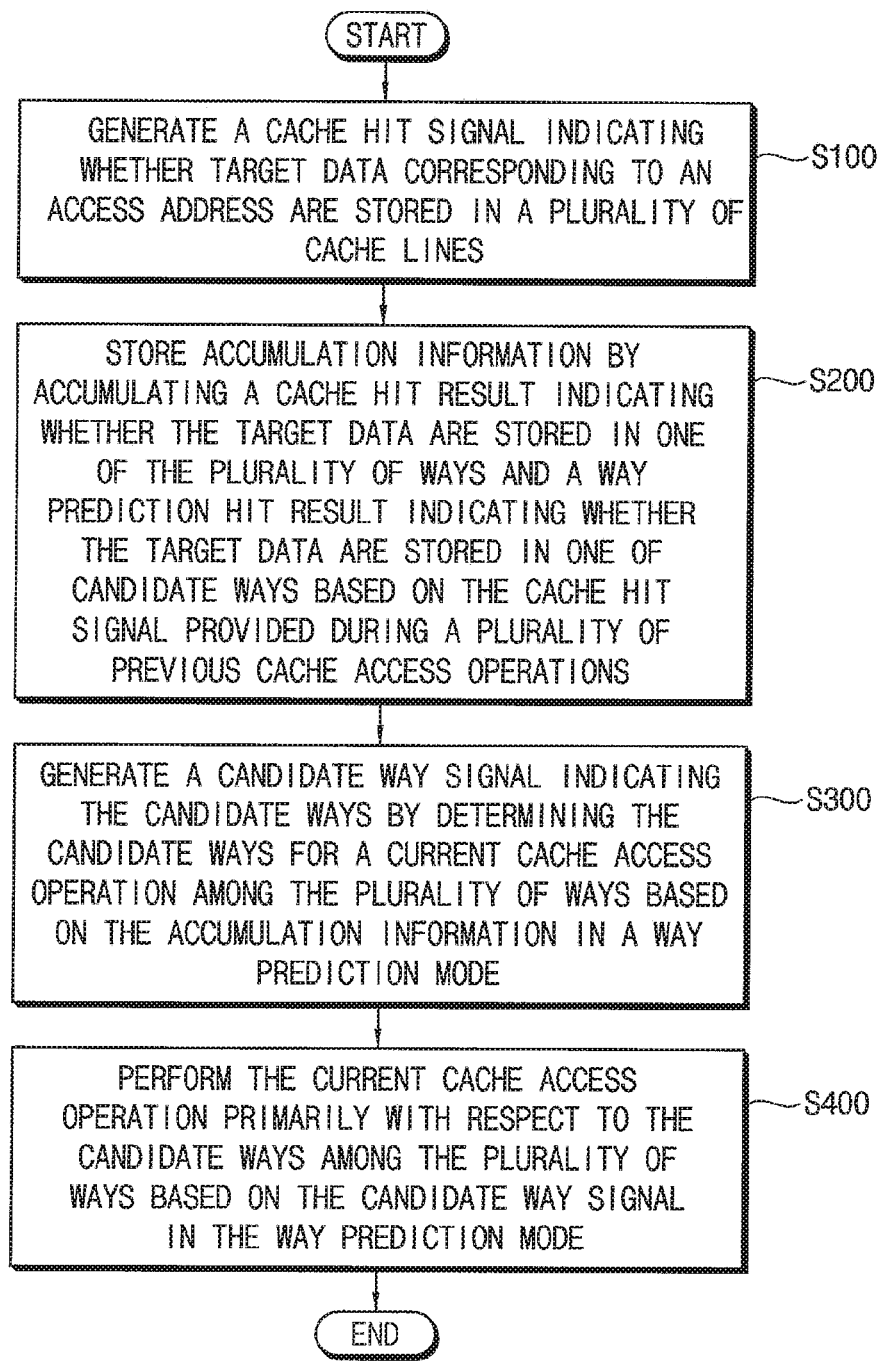
FIG. 2 is a flowchart illustrating a method of operating a cache memory device according to an exemplary embodiment of the inventive concept.

FIG. 2 is a flowchart illustrating a method of operating a cache memory device according to an exemplary embodiment of the inventive concept. FIG. 2 illustrates a method for the set-associated cache structure including a plurality of ways such that each way includes a plurality cache lines corresponding to a plurality of sets.

Referring to FIGS. 1 and 2, the cache circuit 20 may generate the cache hit signal CHT indicating whether the target data SDT corresponding to the access address ADD are stored in the plurality of cache lines (S100).

The way prediction circuit 30 may store accumulation information ACCI by accumulating a cache hit result indicating whether the target data SDT are stored in one of the plurality of ways and a way prediction hit result indicating whether the target data SDT are stored in one of candidate ways based on the cache hit signal CHT provided during a plurality of previous cache access operations (S200). In exemplary embodiments of the inventive concept, the way prediction circuit 30 may store the accumulation information ACCI as a plurality of diagnosis bit pairs such that each diagnosis bit pair includes a cache hit bit indicating the cache hit result and a way prediction hit bit indicating the way prediction hit result. The diagnosis bit pairs will be described below with reference to FIGS. 10 and 11.

The way prediction circuit 30 may generate a candidate way signal SCW by determining one or more candidate ways for a current cache access operation among the plurality of ways based on the accumulation information ACCI in a way prediction mode (S300). In exemplary embodiments of the inventive concept, the way prediction circuit 30 may generate a prediction mode signal SPM indicating enable or disable of the way prediction mode based on the accumulation information ACCI, and provide the prediction mode signal SPM to the cache circuit 20.

The cache circuit 20 may perform the current cache access operation primarily with respect to the candidate ways among the plurality of ways based on the candidate way signal SCW in the way prediction mode (S400). Here, "primarily performing the current cache access operation" represents that the cache circuit 20 performs a primary cache access operation with respect to the candidate ways, and performs a secondary cache access operation with respect to rest of the ways except the candidate ways among the plurality of ways only when the target data SDT are not stored in the candidate ways. The "rest of the ways" may also be referred to as "other ways." The primary cache access operation will be further described below with reference to FIGS. 6 through 9.

As such, the cache memory device 10 and the method of operating the cache memory device 10 according to exemplary embodiments of the inventive concept may reduce power consumption of the cache memory device 10 by exactly predicting the candidate ways based on the accumulation information ACCI.

In exemplary embodiments of the inventive concept, the way prediction circuit 30 may store eviction information on evicted data that are replaced by the new data NDT and deleted from the plurality of cache lines during a valid re-reference interval. The way prediction circuit 30 may generate shield information SHD on protection data based on the eviction information such that the protection data indicate the evicted data that are written again in the cache line during the valid re-reference interval. The way prediction circuit 30 may provide the shield information to the cache circuit 20, and the cache circuit 20 may prevent the protection data from being deleted from the cache line at least one time based on the shield information.

As such, the cache memory device 10 and the method of operating the cache memory device 10 according to exemplary embodiments of the inventive concept may reduce power consumption and enhance performance of the cache memory device 10 by increasing a cache hit ratio and way prediction hit ratio based on the shield information on the protection data having high probability of reuse.

Figure 3:
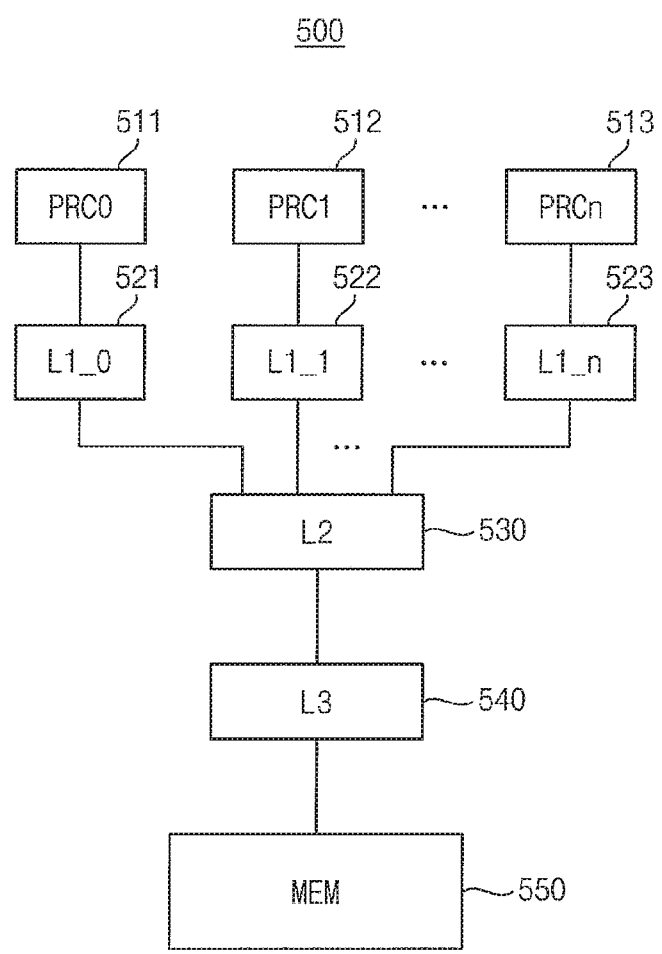
FIG. 3 is a diagram illustrating a hierarchical cache structure of a system according to an exemplary embodiment of the inventive concept.

FIG. 3 is a diagram illustrating a hierarchical cache structure of a system according to an exemplary embodiment of the inventive concept.

Referring to FIG. 3, a system 500 may include a plurality of processors PRC0~PRCn 511, 512, and 513, a plurality of cache memory devices L1_0~L1_n, L2, and L3 521, 522, 523, 530, and 540, and a main memory MEM 550. In case of a multi-core system, the processors 511, 512, and 513 may be referred to as processor cores.

At least one processor and at least one cache memory device may form a processing unit and the processing unit may be implemented as an independent device or a portion of a system on chip (SOC). For example, the processing unit may include central processing units (CPUs), graphics processing units (GPUs), accelerated processing units (APUs), application-specific integrated circuits (ASICs), field programmable gate arrays (FPGAs), or the like.

The main memory 550 may store data used by the processors 511, 512, and 513. Here, the term "data" may include instructions executed by the processors 511, 512, and 513. The system 500 may have a hierarchical (or multilevel) cache structure that is used to increase an access speed to instructions or data that are stored in the main memory 550 by storing copies of the instructions or data in the caches. FIG. 3 illustrates a non-limiting example of the hierarchical cache structure. For example, the hierarchical cache structure may include more or fewer numbers of caches, more or fewer layers of caches, or other hierarchical arrangements of caches.

The hierarchical cache structure may include the cache memory devices 521, 522, and 523 of a lowest level, e.g., the first level L1, and the cache memory devices of higher levels, for example, the cache memory device 530 of the second level L2 and the cache memory device 540 of the third level L3. The cache memory devices of the first level L1 may be private cache memory devices that are accessed dedicatedly by the processors 511, 512, and 513, respectively. The cache memory devices 530 and 540 of the second and third levels L2 and L3 may be shared cache memory devices that are accessed commonly by the processors 511, 512, and 513.

The L3 cache memory device 540 may include a plurality cache lines to store copies of the data stored in the main memory 550. The cache lines may be identified by a combination of an index and a way. The L3 cache memory device 540 may be implemented using faster memory elements and/or may be deployed logically or physically closer to the processors 511, 512, and 513 than the main memory 550, such that data or information may be exchanged between the processors 511, 512, and 513 and the L3 cache memory device 540 more rapidly or with less latency.

The L2 cache memory device 530 may include a plurality cache lines to store copies of the data stored in the main memory 550. The L2 cache memory device 530 may be implemented using faster memory elements and/or may be deployed logically or physically closer to the processors 511, 512, and 513 than the L3 cache memory device 540, such that data or information may be exchanged between the processors 511, 512, and 513 and the L2 cache memory device 530 more rapidly or with less latency.

Each of the L1 cache memory devices 521, 522, and 523 may include a plurality cache lines to store copies of the data stored in the main memory 550 and used by each of the processors 511, 512, and 513. Each of the L1 cache memory devices 521, 522, and 523 may be implemented using faster memory elements and/or may be deployed logically or physically closer to the processors 511, 512, and 513 than the L2 cache memory device 530, such that data or information may be exchanged between the processors 511, 512, and 513 and the L1 cache memory devices 521, 522, and 523 more rapidly or with less latency.

In a cache access operation, each of the processors 511, 512, and 513 may send memory access requests to a corresponding one of the L1 cache memory devices 521, 522, and 523 to obtain copies of instructions or data that are stored in the corresponding L1 cache memory device. If the requested information is stored in the corresponding L1 cache memory device, e.g., as indicated by a match between an address or a portion of an address in the memory access request and a cache tag associated with a cache line in the corresponding L1 cache memory device, the processor may be given access to the cache line. This is conventionally referred to as a cache hit.

If the requested information is not stored in any of the cache lines of the corresponding L1 cache memory device, which is conventionally referred to as a cache miss, the memory access request is forwarded to the L2 cache memory device 530. If the memory access request hits in the L2 cache memory device 530, the processor may be given access to the cache line in the L2 cache memory device 530.

If the memory access request misses in the L2 cache memory device 530, the memory access request is forwarded to the L3 cache memory device 540. Such processes are iterated at progressively higher levels of the cache structure until a cache hit occurs or the requested information is accessed in the main memory 550.

Cache lines in the L3 cache memory device 540, the L2 cache memory device 530, and the L1 cache memory devices 521, 522, and 523 may be replaced in response to a cache miss. For example, if a memory access request by the processor 511 misses in the L1 cache memory device 521 and hits in the L2 cache memory device 530, the instruction or data stored in the accessed cache line of the L2 cache memory device 530 may be copied to a cache line in the L1 cache memory device 521 so that the copied data may be available for subsequent memory access requests by the corresponding processor 511. Information previously stored in one of the cache lines may be evicted to make room for the new information if all of the cache lines are currently storing information. Cache lines are selected for eviction based on a cache replacement policy. For example, the cache replacement policy may be based on least recently used (LRU) policy or re-reference interval prediction (RRIP) policy.

The hierarchical cache structure as illustrated in FIG. 3 may include at least one cache memory device according to an exemplary embodiment of the inventive concept. In exemplary embodiments of the inventive concept, as will be described with reference to FIGS. 11 through 17, a cache memory device according to exemplary embodiments of the inventive concept may be applied to the shared cache memory devices 530 and 540. In exemplary embodiments of the inventive concept, as will be described with reference to FIGS. 18 through 20, a cache memory device according to exemplary embodiments of the inventive concept may be applied to the private cache memory devices 521, 522, and 523.

Figure 4:
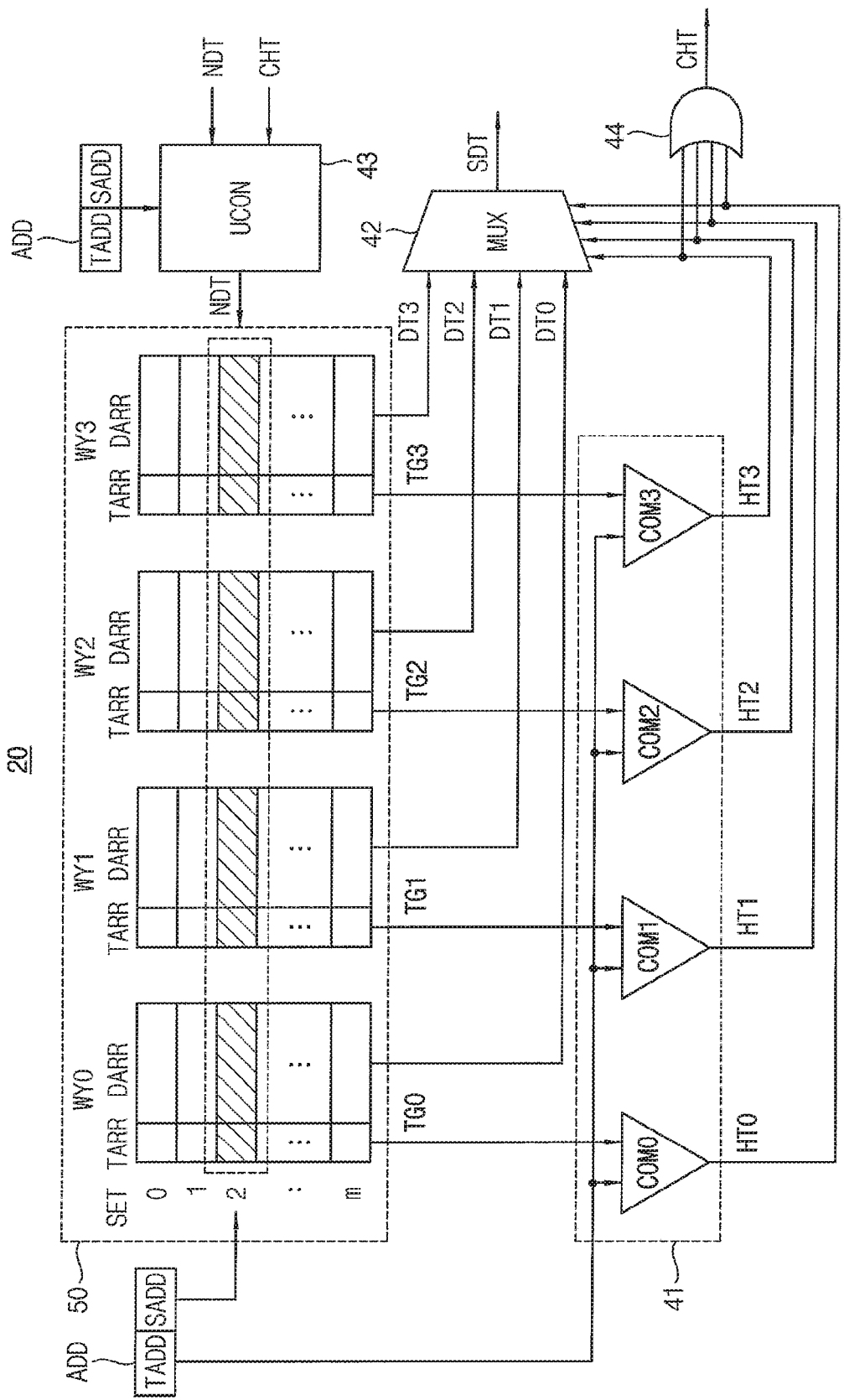
FIG. 4 is a diagram illustrating a cache circuit included in a cache memory device according to an exemplary embodiment of the inventive concept.

FIG. 4 is a diagram illustrating a cache circuit included in a cache memory device according to an exemplary embodiment of the inventive concept. For convenience of illustrations, FIG. 4 illustrates only the components for describing a way prediction policy and an operation based on the way prediction policy according to an exemplary embodiment of the inventive concept.

Referring to FIG. 4, the cache circuit 20 may include the cache memory 50, a tag comparison circuit 41, a data output circuit MUX 42, an update controller UCON 43, and a cache hit determination circuit 44. The components 41, 42, 43, and 44 may be included in the cache controller 40 in FIG. 1.

The cache memory 50 may include a tag memory TARR and a data memory DARR. The data memory DARR stores some pieces of the data (e.g., cache data) stored in the main memory 550 in FIG. 3. In other words, the cache data may be the same as any one piece of main data stored in the main memory 550. The tag memory TARR stores pieces of tag data respectively corresponding to the pieces of cache data stored in the data memory DARR. The tag data may indicate an actual address of the main memory 550 where the cache data are stored.

FIG. 4 illustrates an example of a 4-way set-associative cache structure having four ways. The tag memory TARR and the data memory DARR may include a plurality of ways including a plurality of cache lines and a plurality of sets such that each set may be selected based on a set address SADD included in the access address ADD. Rows and columns of the tag memory TARR and the data memory DARR indicate sets and the ways, respectively. In other words, one set is stored at the same row of the tag memory TARR and the data memory DARR.

FIG. 4 illustrates the 4-way set-associated cache structure implemented with m+1 sets designated by indices from 0 to m and four ways WY0~WY3. As illustrated in FIG. 4, one set may store first through fourth cache data DT0~DT3 and first through fourth tag data TG0~TG3 indicating the respective tag addresses of the first through fourth cache data DT0~DT3.

Additionally, the first through fourth tag data TG0~TG3 are stored in the same row of the tag memory TARR. The first tag data TG0 corresponds to the first way WY0, the second tag data TG1 corresponds to the second way WY1, the third tag data TG2 corresponds to the third way WY2, and the fourth tag data TG3 corresponds to the fourth way WY3. The first through fourth cache data DT0~DT3 respectively corresponding to the first through fourth tag data TG0~TG3 may be stored in the data memory DARR in the same manner as the first through fourth tag data TG0~TG3.

The cache circuit 20 receives the access address ADD corresponding to the target data, e.g., the data requested by a processor. The access address ADD, as illustrated in FIG. 4, includes the tag address TADD and the set address SADD. The set address SADD indicates a row address of the cache memory 50. In other words, the set address SADD indicates any one set of a plurality of sets included in the cache memory 50.

When there is externally requested data, for example, by a processor or a processor core, the tag comparison circuit 41 may determine whether the requested data or the target data are stored in the cache memory 50. In other words, the tag comparison circuit 41 determines whether there is a cache hit or a cache miss.

The tag comparison circuit 41 may include comparators COM0~COM3 to compare each of the tag data TG0~TG3 stored in and read from the set corresponding to the set address SADD with the tag address TADD. The comparators COM0~COM3 may activate way hit signals HT0~HT3, respectively, when a corresponding one of the first through fourth tag data TG0~TG3 coincides with the tag address TADD. The cache hit determination circuit 44 may activate the cache hit signal CHT to indicate the cache hit when at least one of the way hit signals HT0~HT3 is activated. In other words, the cache hit indicates that the target data that is externally requested exists in the data memory DARR.

When the cache hit signal CHT indicates the cache hit, the target data SDT corresponding to the tag data that matches the tag address TADD may be output. In other words, the tag comparison circuit 41 outputs the way hit signals HT0~HT3 to the data output circuit 42, and the data output circuit 42 may select one of the cache data DT0~DT3, corresponding to the activated way hit signal, to output the selected cache data as the target data SDT. In contrast, in case of the cache miss, the cache hit determination circuit 44 may deactivate the cache hit signal CHT to indicate the cache miss.

The update controller 43 may delete the cache data corresponding to evicted data from the one cache line, which may be determined by the cache replacement policy, and the new data NDT provided from a higher-level cache memory device or the main memory (e.g., 550) may be stored or written in the cache line in which the evicted data have been stored.

Figure 5:
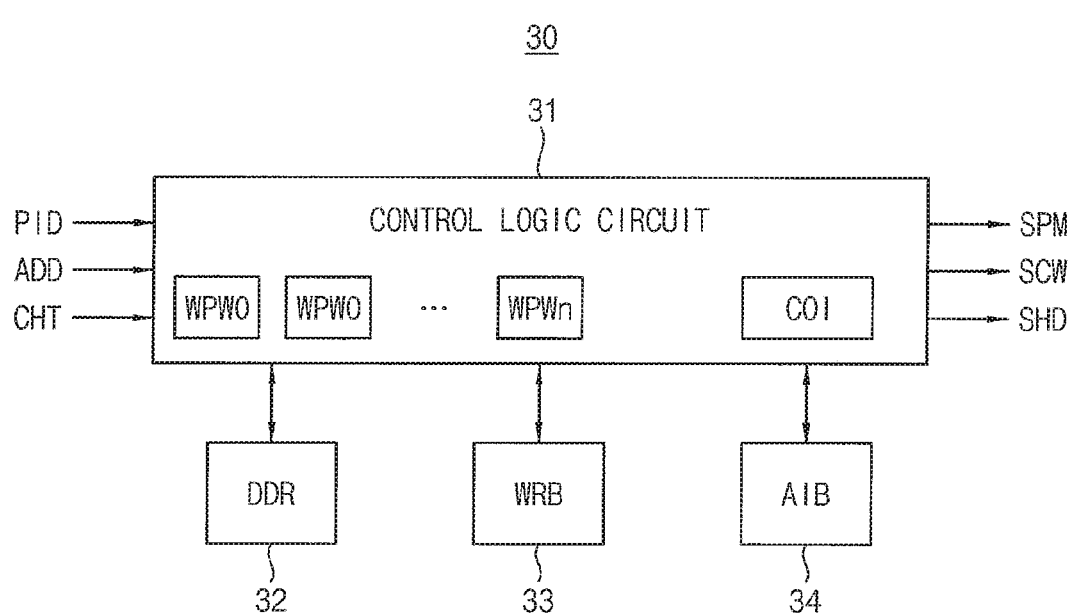
FIG. 5 is a diagram illustrating a way prediction circuit included in a cache memory device according to an exemplary embodiment of the inventive concept.

FIG. 5 is a diagram illustrating a way prediction circuit included in a cache memory device according to an exemplary embodiment of the inventive concept.

Referring to FIG. 5, the way prediction circuit 30 may include a control logic circuit 31, a differential diagnosis register DDR 32, a way rank buffer WRB 33, and an auxiliary inference buffer AIB 34.

The differential diagnosis register 32, with respect to each of a plurality of processors and each of a plurality of sets, may store the accumulation information ACCI by accumulating a plurality of diagnosis bit pairs during a plurality of previous cache access operations, such that each diagnosis bit pair includes a cache hit bit indicating a cache hit result and a way prediction hit bit indicating a way prediction hit result. The plurality of diagnosis bit pairs stored in the differential diagnosis register 32 will be further described below with reference to FIGS. 10 and 11.

The way rank buffer 33, with respect to each of the plurality of processors and each of the plurality of sets, may store priority information indicating an order that the plurality of ways are included in the candidate ways. The priority information stored in the way rank buffer 33 will be further described below with reference to FIG. 12.

The auxiliary inference buffer 34 may store eviction information on evicted data that are replaced by new data and deleted from the plurality of cache lines during a valid re-reference interval. The eviction information stored in the auxiliary inference buffer 34 will be further described below with reference to FIG. 13.

The control logic circuit 31 may manage the diagnosis bit pairs stored in the differential diagnosis register 32, the priority information stored in the way rank buffer 33, and the eviction information stored in the auxiliary inference buffer 34, based on the processor identifier PID, the access address ADD, and the cache hit signal CHT. In exemplary embodiments of the inventive concept, the control logic circuit 31 may be implemented with a special function register (SFR).

The control logic circuit 31 may generate a candidate way signal SCW corresponding to a processor and a set related with a current cache access operation based on the plurality of diagnosis bit pairs stored in the differential diagnosis register 32.

In exemplary embodiments of the inventive concept, the control logic circuit 31 may store a plurality of way prediction windows WPW0~WPWn corresponding to the plurality of processors and the plurality of sets, such that each way prediction window indicates a number of the candidate ways corresponding to each processor and each set. The control logic circuit 31 may determine the candidate ways corresponding to a processor and a set related with the current cache access operation based on the plurality of way prediction windows WPW0~WPWn and the priority information stored in the way rank buffer 33.

The control logic circuit 31 may update the plurality of way prediction windows WPW0~WPWn on the fly per cache access operation based on the plurality of diagnosis bit pairs stored in the differential diagnosis register 32.

In exemplary embodiments of the inventive concept, the control logic circuit 31 may store cache occupation information COI indicating identifiers of processors corresponding to data stored in the plurality of cache lines. The control logic circuit 31 may generate shield information SHD on protection data based on the cache occupation information COI and the eviction information stored in the auxiliary inference buffer 34 such that the protection data indicate the evicted data that are written again in the cache line during the valid re-reference interval, and provide the shield information SHD to the cache circuit 20 in FIG. 1. The cache circuit 20 may prevent the protection data from being deleted from the cache line at least one time based on the shield information SHD.

In exemplary embodiments of the inventive concept, the control logic circuit 31 may generate the prediction mode signal SPM indicating enable or disable of the way prediction mode based on the accumulation information ACCI including the diagnosis bit pairs stored in the differential diagnosis register 32, and provide the prediction mode signal SPM to the cache circuit 20. The cache circuit 20 may perform the current cache access operation primarily with respect to the candidate ways among the plurality of ways based on the candidate way signal SCW indicating one or more candidate ways in the way prediction mode.

Figure 6:
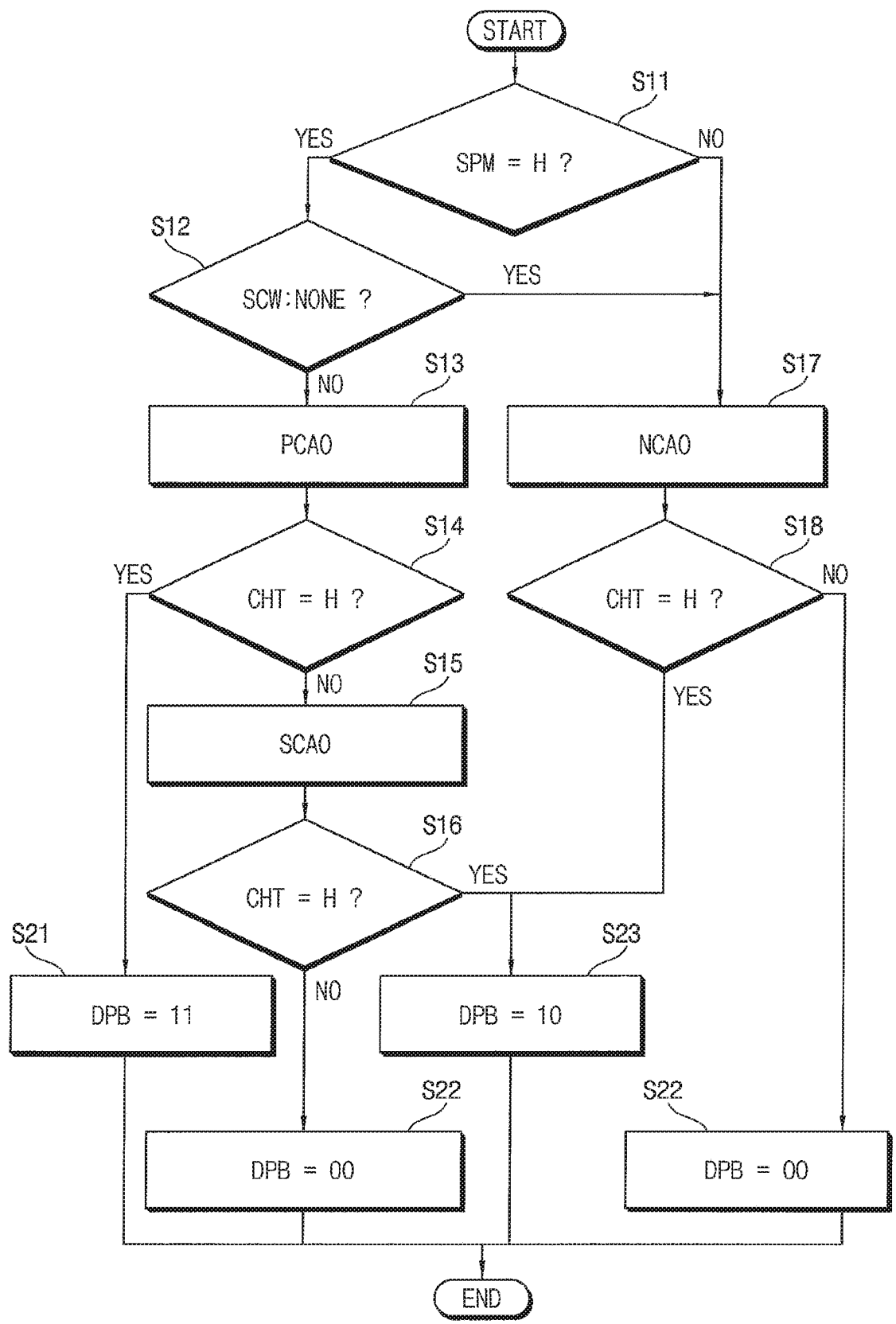
FIG. 6 is a flowchart illustrating a cache access operation of a cache memory device according to an exemplary embodiment of the inventive concept.

FIG. 6 is a flowchart illustrating a cache access operation of a cache memory device according to an exemplary embodiment of the inventive concept.

For convenience of illustration and description, FIG. 6 illustrates an example where a logic high level H of the prediction mode signal SPM indicates the way prediction mode and the logic high level H of the cache hit signal CHT indicates the cache hit, but the inventive concept is not limited to these specific logic levels of the signals.

Referring to FIGS. 1 and 6, the cache circuit 20 receives the prediction mode signal SPM and the candidate way signal SCW from the way prediction circuit 30. When the prediction mode signal SPM indicates the way prediction mode (S11: YES), the cache circuit 20 determines whether the candidate way signal SCW includes none of the candidate ways (S12). When the candidate way signal SCW includes one or more candidate ways (S12: NO), the cache circuit 20 may perform a primary cache access operation PCAO with respect to the candidate ways among the plurality of ways (S13) as will be described below with reference to FIG. 7. When the cache hit signal CHT for the primary cache access operation PCAO indicates the cache hit (S14: YES), the way prediction circuit 30 may store, as the accumulation information ACCI, the diagnosis bit pair (for example, "11") indicating the cache hit and the way prediction hit (S21). The cache hit signal CHT for the primary cache access operation PCAO may be referred to as a first cache hit signal.

When the cache hit signal CHT for the primary cache access operation PCAO indicates the cache miss (S14: NO), the cache circuit 20 may perform a secondary cache access operation SCAO with respect to the rest of the ways except the candidate ways (S15) among the plurality of ways, as will be described below with reference to FIG. 8. When the cache hit signal CHT for the secondary cache access operation SCAO indicates the cache miss (S16: NO), the way prediction circuit 30 may store, as the accumulation information ACCI, the diagnosis bit pair (for example, "00") indicating the cache miss (S22). The cache hit signal CHT for the secondary cache access operation SCAO may be referred to as a second cache hit signal.

When the prediction mode signal SPM does not indicate the way prediction mode (S11: NO) or when the candidate way signal SCW includes none of the candidate ways (S12: YES), the cache circuit 20 may perform a normal cache access operation NCAO (S17) with respect to all of the plurality of ways, as will be described below with reference to FIG. 9.

When the cache hit signal CHT for the normal cache access operation NCAO indicates the cache hit (S18: YES) or when the cache hit signal CHT for the secondary cache access operation SCAO indicates the cache hit (S16: YES), the way prediction circuit 30 may store, as the accumulation information ACCI, the diagnosis bit pair (for example, "10") indicating the cache hit but no information on the way prediction hit result (S23). When the cache hit signal CHT for the normal cache access operation NCAO indicates the cache miss (S18: NO), the way prediction circuit 30 may store, as the accumulation information ACCI, the diagnosis bit pair (for example, "00") indicating the cache miss (S22). The cache hit signal CHT for the normal cache access operation NCAO may be referred to as third cache hit signal.

Thus, referring to FIG. 6, the way prediction circuit 30 may store the diagnosis bit pair as the accumulation information ACCI based on at least one of the first cache hit signal, the second cache hit signal, and the third cache hit signal. The diagnosis bit pair is set to a first value (e.g., "11") when the first cache hit signal indicates a cache hit. The diagnosis bit pair is set to a second value (e.g., "00") when the second cache hit signal does not indicate a cache hit. The diagnosis bit pair is set to a third value (e.g., "10") when the second cache hit signal indicates a cache hit or the third cache hit signal indicates a cache hit. The diagnosis bit pair is set to a fourth value (e.g., "00") when the third cache hit signal does not indicate a cache hit.

Figure 7:
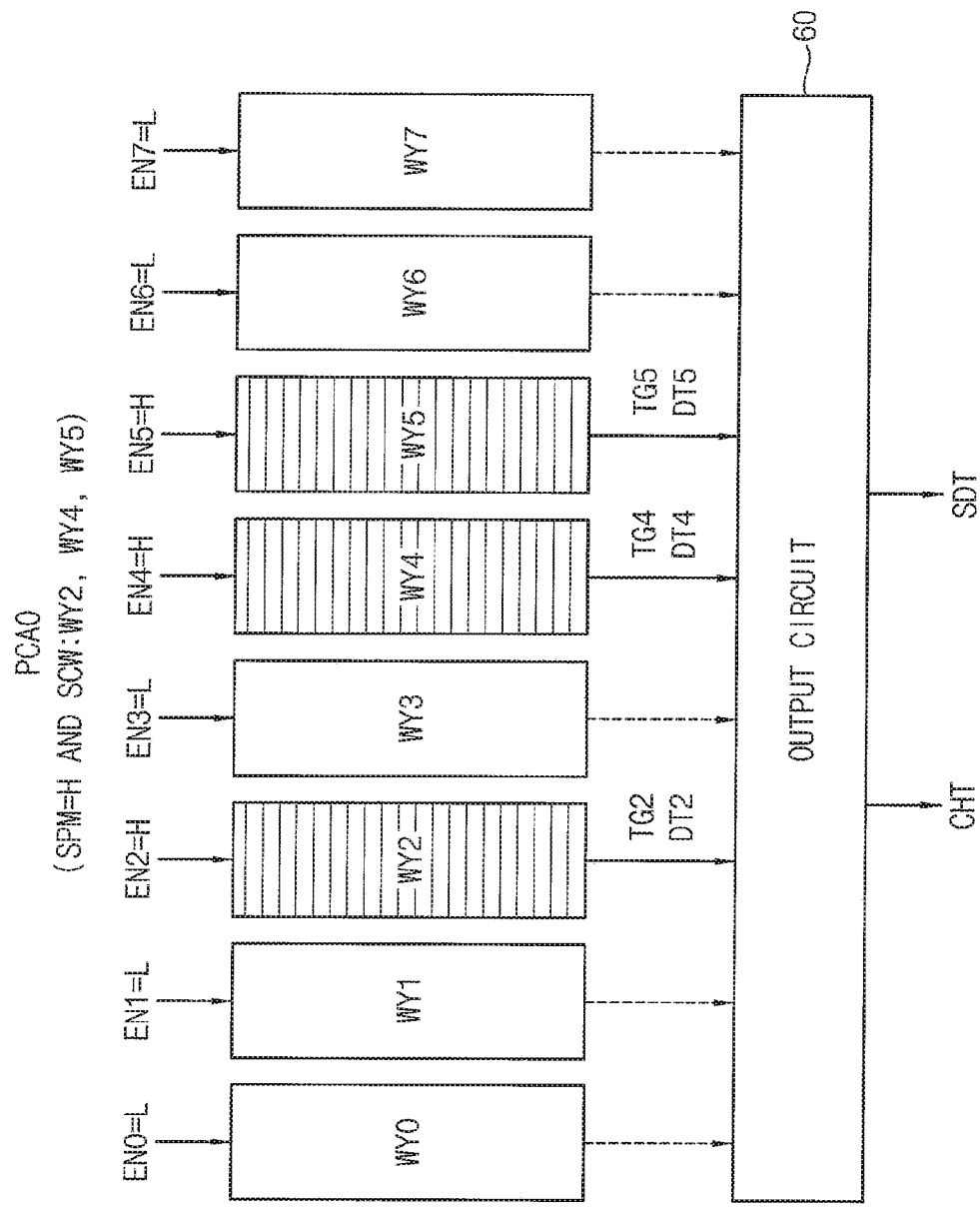
FIG. 7 is a diagram illustrating a primary cache access operation of a cache memory device according to an exemplary embodiment of the inventive concept.
Figure 8:
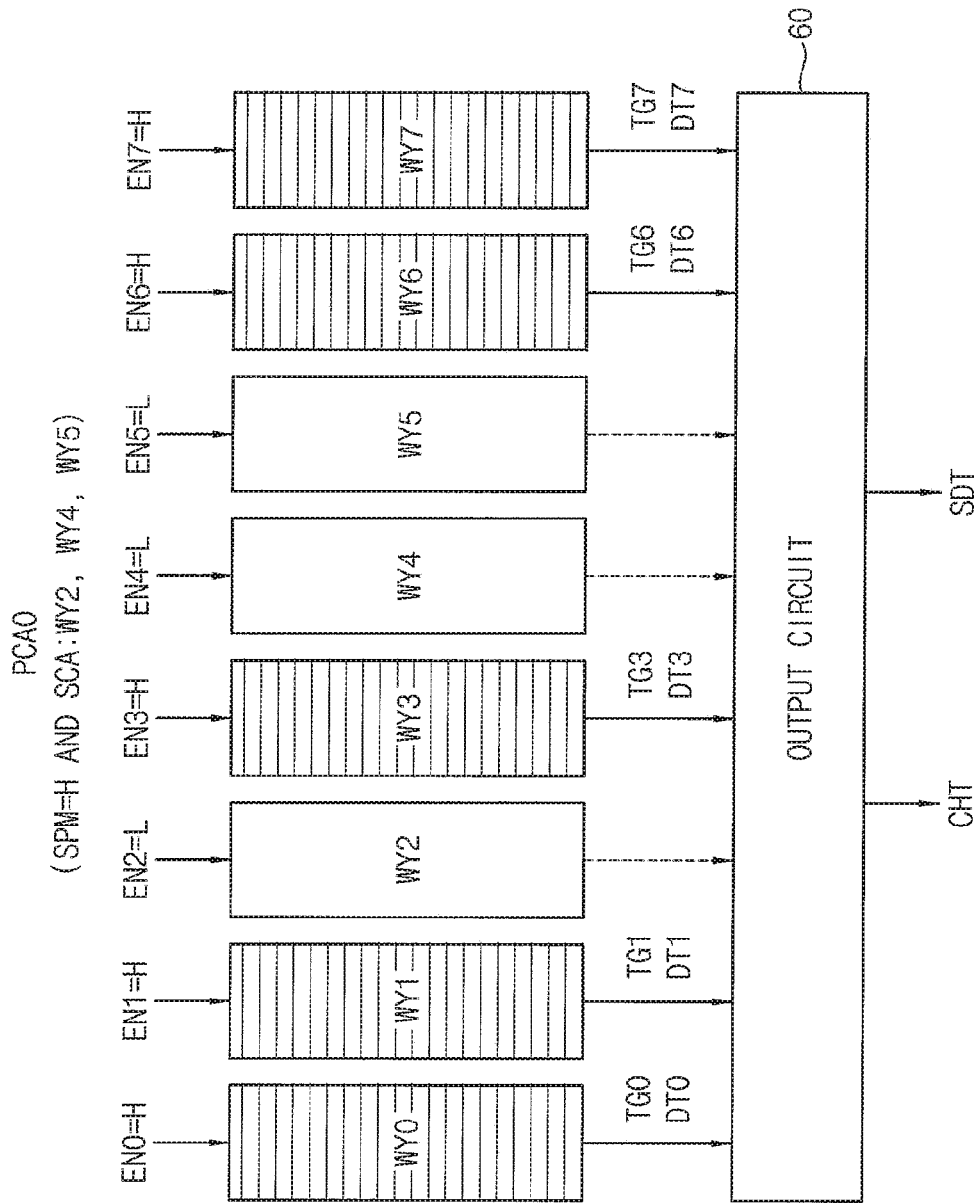
FIG. 8 is a diagram illustrating a secondary cache access operation of a cache memory device according to an exemplary embodiment of the inventive concept.
Figure 9:
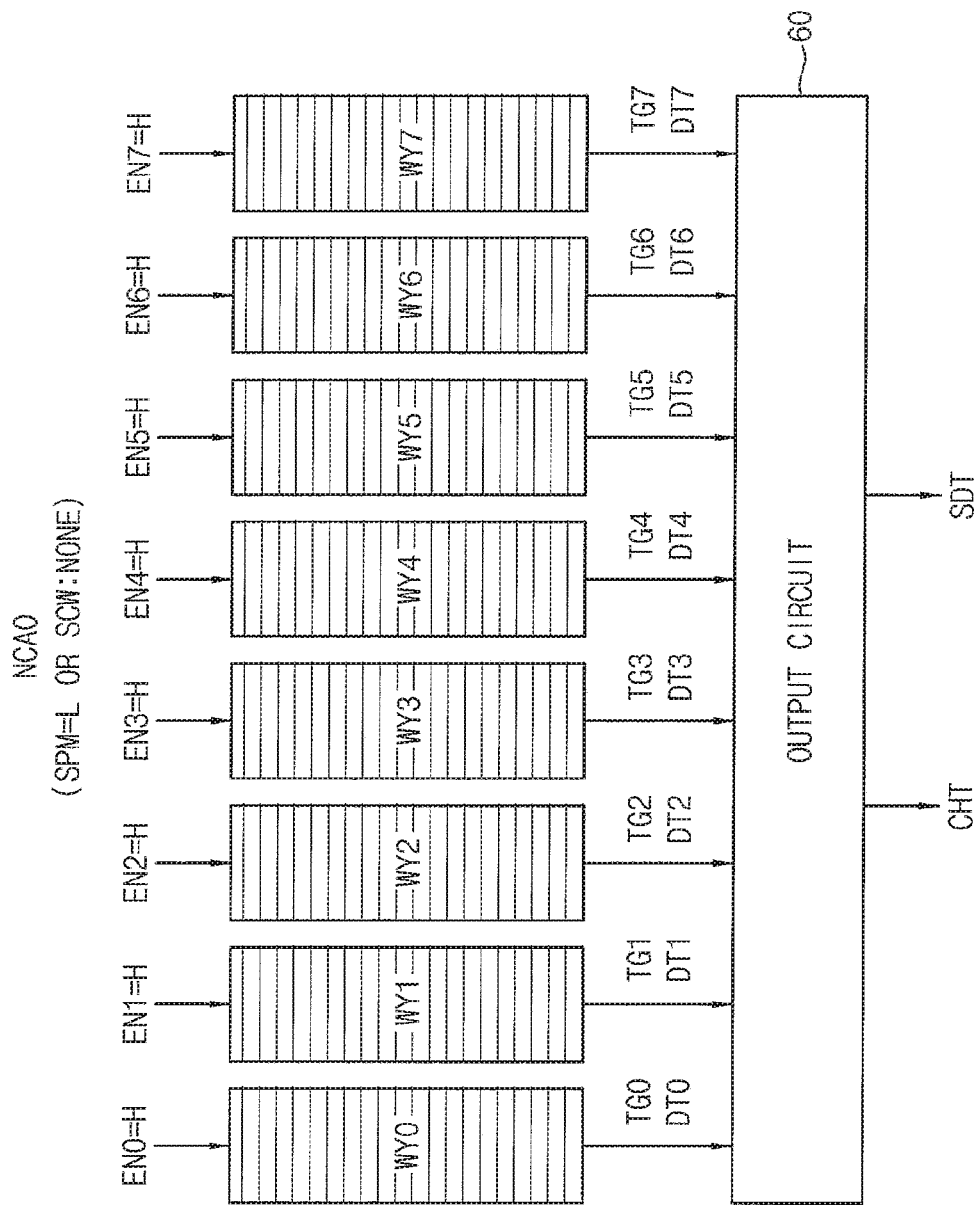
FIG. 9 is a diagram illustrating a normal cache access operation of a cache memory device according to an exemplary embodiment of the inventive concept.

FIG. 7 is a diagram illustrating a primary cache access operation of a cache memory device according to an exemplary embodiment of the inventive concept, FIG. 8 is a diagram illustrating a secondary cache access operation of a cache memory device according to an exemplary embodiment of the inventive concept, and FIG. 9 is a diagram illustrating a normal cache access operation of a cache memory device according to an exemplary embodiment of the inventive concept.

For convenience of illustration and description, FIGS. 7, 8, and 9 illustrate an example where a cache circuit include first through eighth ways WY0~WY8, but the inventive concept is not limited to a specific number of ways. An output circuit 60 illustrated in FIGS. 7, 8, and 9 may include the tag comparison circuit 41, the data output circuit MUX 42, and the cache hit determination circuit 44 as described with reference to FIG. 4.

Referring to FIGS. 7 and 8, the prediction mode signal SPM may be activated to indicate the enable of the way prediction mode. For example, the candidate way signal SCW may indicate that the third way WY2, the fifth way WY4, and the sixth way WY5 are candidate ways.

As illustrated in FIG. 7, the cache circuit may perform the primary cache access operation PCAO with respect to the candidate ways WY2, WY4, and WY5. In other words, the cache controller in the cache circuit may activate, among first through eighth way enable signals EN0~EN7 respectively corresponding to the first through eighth ways WY0~WY7, the way enable signals EN2, EN4, and EN5 corresponding to the candidate ways WY2, WY4, and WY5, for example, to the logic high level H, and deactivate the way enable signals EN0, EN1, EN3, EN6, and EN7 corresponding to the rest of the ways WY0, WY1, WY3, WY6, and WY7 except the candidate ways WY2, WY4, and WY5, for example, to the logic low level L. As a result, only the tag data TG2, TG4, and TG5 and the cache data DT2, DT4, and DT5 corresponding to the candidate ways WY2, WY4, and WY5 may be output and provided to the output circuit 60.

When the target data SDT are stored in the candidate ways WY2, WY4, and WY5 as the result of the primary cache access operation PCAO, the output circuit 60 may output the cache hit signal CHT indicating the cache hit and output the target data SDT.

When the target data SDT are not stored in the candidate ways WY2, WY4, and WY5 as the result of the primary cache access operation PCAO, the output circuit 60 may output the cache hit signal CHT indicating the cache miss, and the cache circuit may perform the secondary cache access operation SCAO.

As illustrated in FIG. 8, the cache circuit may perform the secondary cache access operation SCAO with respect to the rest of the ways WY0, WY1, WY3, WY6, and WY7 except the candidate ways WY2, WY4, and WY5. In other words, the cache controller in the cache circuit may activate the way enable signals EN0, EN1, EN3, EN6, and EN7 corresponding to the rest of the ways WY0, WY1, WY3, WY6, and WY7, for example, to the logic high level H, and deactivate the way enable signals EN2, EN4, and EN5 corresponding to the candidate ways WY2, WY4, and WY5, for example, to the logic low level L. As a result, only the tag data TG0, TG1, TG3, TG6, and TG7 and the cache data DT0, DT1, DT3, DT6, and DT7 corresponding to the rest of the ways WY0, WY1, WY3, WY6, and WY7 may be output and provided to the output circuit 60.

When the target data SDT are stored in the rest of the ways WY0, WY1, WY3, WY6, and WY7 as the result of the secondary cache access operation SCAO, the output circuit 60 may output the cache hit signal CHT indicating the cache hit and output the target data SDT.

When the target data SDT are not stored in the rest of the ways WY0, WY1, WY3, WY6, and WY7 as the result of the secondary cache access operation SCAO, the output circuit 60 may output the cache hit signal CHT indicating the cache miss.

Referring to FIG. 9, when the prediction mode signal SPM is deactivated to indicate the disable of the way prediction mode, the cache circuit may perform the normal cache access operation NCAO with respect to all of the candidate ways WY0~WY7. In other words, the cache controller in the cache circuit may activate the way enable signals EN0~EN7 corresponding to all of the first through eighth ways WY0~WY7, for example, to the logic high level H. As a result, the tag data TG0~TG7 and the cache data DT0~DT7 corresponding to all of the ways WY0~WY7 may be output and provided to the output circuit 60.

In addition, the cache circuit may perform the normal cache access operation NCAO with respect to all of the ways WY0~WY7 when the candidate way signal SCW includes none of the candidate ways (SCW: NONE) as described with reference to FIG. 6.

When the target data SDT are stored in the ways WY0~WY7 as the result of the normal cache access operation NCAO, the output circuit 60 may output the cache hit signal CHT indicating the cache hit and output the target data SDT.

When the target data SDT are not stored in the ways WY0~WY7 as the result of the normal cache access operation NCAO, the output circuit 60 may output the cache hit signal CHT indicating the cache miss.

As described with reference to FIGS. 6 and 9, power consumption may be reduced in the primary cache access operation PCAO by enabling only the candidate ways and disabling the rest of the ways. If the cache miss occurs in the primary cache access operation PCAO, the latency of accessing the data may be increased by performing the secondary cache access operation SCAO. As described above, the candidate ways may be predicted and determined exactly based on the accumulation information ACCI according to exemplary embodiments of the inventive concept, and thus, power consumption may be reduced efficiently while minimizing the increase of the access latency.

Figure 10:
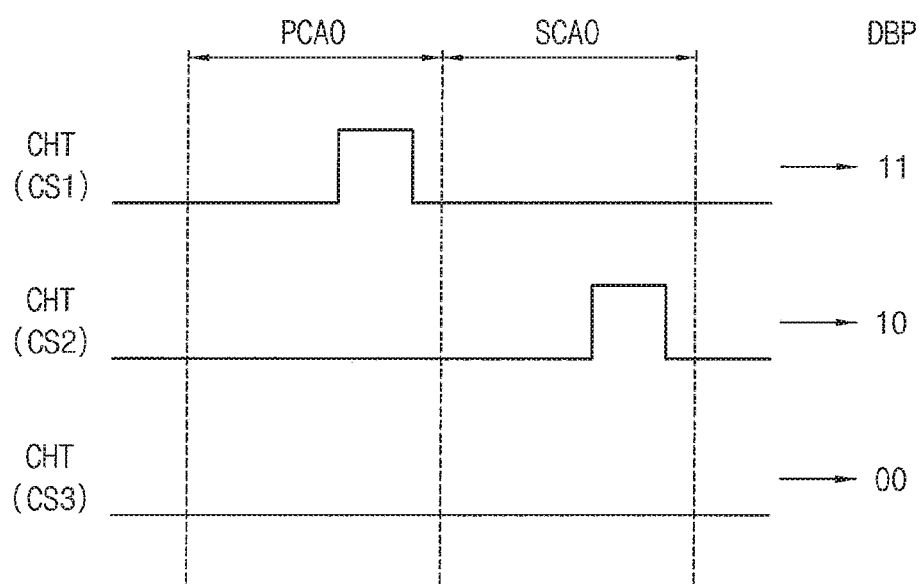
FIG. 10 is a diagram for describing diagnosis bit pairs stored in a cache memory device according to an exemplary embodiment of the inventive concept.
Figure 11:
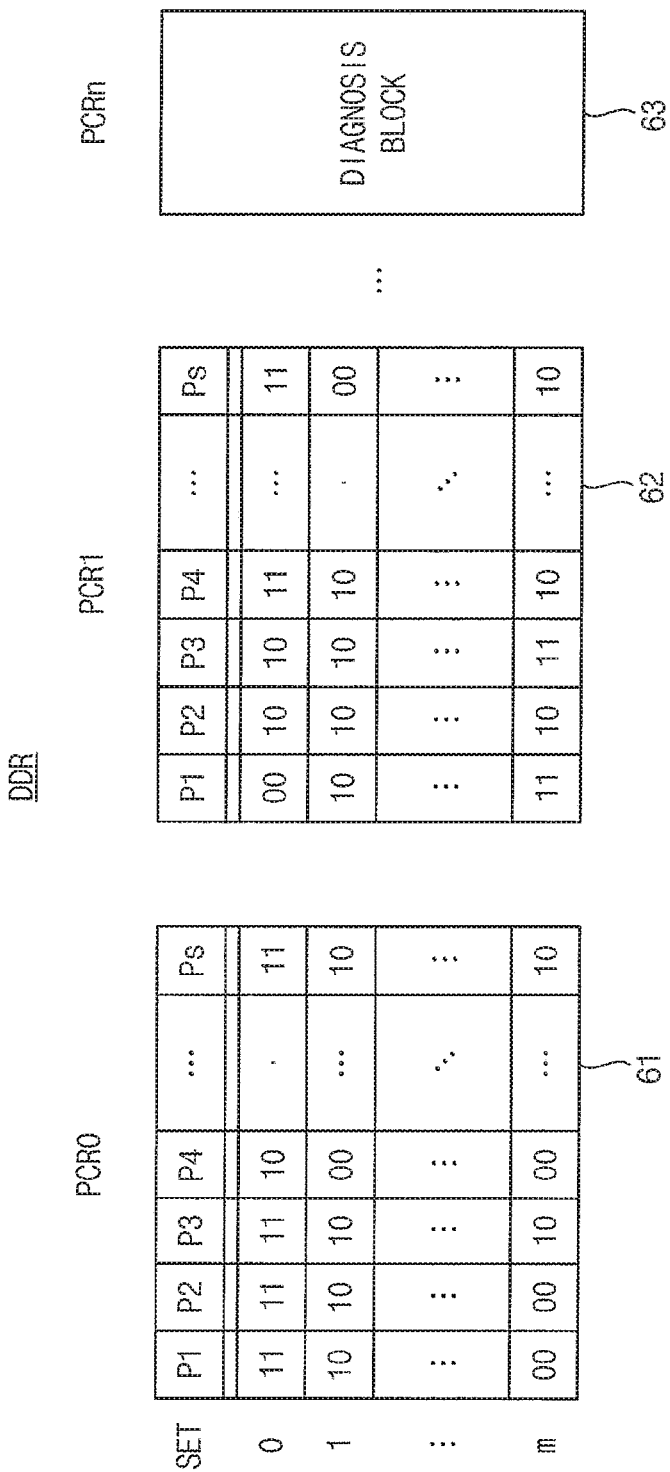
FIG. 11 is a diagram illustrating a differential diagnosis register included in a cache memory device according to an exemplary embodiment of the inventive concept.

FIG. 10 is a diagram for describing diagnosis bit pairs stored in a cache memory device according to exemplary embodiments of the inventive concept, and FIG. 11 is a diagram illustrating a differential diagnosis register included in a cache memory device according to an exemplary embodiment of the inventive concept.

Referring to FIG. 10, the cache hit signal CHT may be activated to the logic high level when the cache hit occurs, with respect to each of the primary cache access operation PCAO and the secondary cache access operation SCAO.

A first case CS1 indicates that the target data SDT are stored in the candidate ways. In this case, the way prediction circuit may store the value (e.g., "11") of the diagnosis bit pair indicating the cache hit and the way prediction hit as the accumulation information ACCI.

A second case CS2 indicates that the target data SDT are stored in the rest of the ways except the candidate ways. In this case, the way prediction circuit may store the value (e.g., "10") of the diagnosis bit pair indicating the cache hit and the way prediction miss as the accumulation information ACCI.

A third case CS3 indicates that the target data SDT are not stored in any one of the ways. In this case, the way prediction circuit may store the value (e.g., "00") of the diagnosis bit pair indicating the cache miss as the accumulation information ACCI.

An exemplary embodiment has been described with reference to FIG. 10 such that the cache hit result and the way prediction hit result are indicated by one cache hit signal CHT, but the inventive concept is not limited thereto. In exemplary embodiments of the inventive concept, the cache hit result and the way prediction hit result may be provided from the cache circuit to the way prediction circuit using two signals, respectively.

Referring to FIG. 11, the differential diagnosis register DDR may include a plurality of diagnosis blocks 61, 62, and 63 to store a plurality of diagnosis bit pairs P1~Ps, with respect to each of a plurality of processors PCR0~PCRn and each of a plurality of sets (SET=0~m). Each of the diagnosis bit pairs P1~Ps may include a cache hit bit (e.g., the higher significant bit) indicating the cache hit result and a way prediction hit bit (e.g., the lower significant bit) indicating the way prediction hit result. The number "s" of the diagnosis bit pairs (P1~Ps) may be determined variously according to a configuration and operation condition of a system including the cache memory device.

For example, P1 may be the diagnosis bit pair corresponding to the most recent cache access operation and Ps may be the diagnosis bit pair corresponding to the least recent cache access operation. The diagnosis bit pairs P1~Ps may be managed and stored by a first-in first-out (FIFO) scheme. In other words, for each cache access operation, the oldest diagnosis bit pair may be deleted, and a new diagnosis bit pair may be stored in the diagnosis block and the set corresponding to each cache access operation. As such, the plurality of diagnosis bit pairs P1~Ps may be accumulated during a plurality of previous cache access operations as the accumulation information ACCI.

The control logic circuit 31 in FIG. 5 may determine, based on the plurality of diagnosis bit pairs, whether the current cache access pattern is suitable for the way prediction to enable or disable of the way prediction mode. For example, the way prediction mode may be disabled if a predetermined number of cache misses and/or the way prediction misses occur consecutively.

FIG. 12 is a diagram illustrating a way rank buffer included in a cache memory device according to an exemplary embodiment of the inventive concept.

Referring to FIG. 12, the way rank buffer WRB, with respect to each of a plurality of processors having priorities PR1~PRk and each of the plurality of sets (SET=0~m), store priority information indicating an order that a plurality of ways are included in the candidate ways. Each row in the way rank buffer WRB may store one priority information indicating priorities PR1~PRk corresponding to each set. PR1 indicates the highest priority and PRk indicates the lowest priority.

Each entity stored in the way rank buffer WRB may indicate a way number and a processor number of a corresponding priority. For example, with respect to $3_1$ stored in the highest priority PR1 of the first set (SET=0), 3 indicates the way number and 1 indicates the processor number. In other words, the way WY3 stores the cache data corresponding to the processor having the highest priority PR1.

The priority information stored in the way rank buffer WRB may be updated on the fly per cache access operation based on the plurality of diagnosis bit pairs. The update of the priority information will be described below with reference to FIG. 17.

FIG. 13 is a diagram illustrating an auxiliary inference buffer included in a cache memory device according to an exemplary embodiment of the inventive concept.

Referring to FIG. 13, the auxiliary inference buffer AIB may store eviction information on evicted data that are replaced by new data and deleted from a plurality of cache lines during a valid re-reference interval. The auxiliary inference buffer AIB may include entries (1~q) to store the eviction information corresponding to q evicted data, respectively. The number q of the entries may be determined depending on the valid re-reference interval, which will be described below with reference to FIG. 15.

As illustrated in FIG. 13, the eviction information stored in the auxiliary inference buffer AIB may include an address of the evicted data, a victim identifier PIDv indicating a processor that previously wrote the evicted data in the cache line, and an attacker identifier PIDa indicating a processor that deleted the evicted data from the cache line. FIG. 13 illustrates example numbers of the victim identifier PIDv and the attacker identifier PIDa corresponding to the addresses of the evicted data.

The control logic circuit 31 in FIG. 5 may set a value of an interference bit DI by determining whether the victim identifier PIDv coincides with the attacker identifier PIDa. For example, the value of the interference bit DI may be set to 1 when the victim identifier PIDv coincides with the attacker identifier PIDa.

In addition, the control logic circuit 31 may set a value of a reuse bit RU by determining whether the address of the new data that are newly stored in the cache circuit coincides with the address of the evicted data stored in the auxiliary inference buffer AIB. For example, the value of the reuse bit RU may be set to 1 when the new data coincides with the address of the evicted data stored in the auxiliary inference buffer AIB.

The control logic circuit 31 in the way prediction circuit 30 may generate the shield information SHD on protection data based on the eviction information stored in the auxiliary inference buffer AIB, where the protection data indicate the evicted data that are written again in the cache line during the valid re-reference interval, and may provide the shield information SHD to the cache circuit 20 in FIG. 1.

The cache circuit 20 may prevent the protection data from being deleted from the cache line at least one time based on the shield information SHD. As such, the cache circuit 20 reflects the shield information SHD to the above-described cache replacement policy to cause the protection data having high probability of reuse to not be deleted and reside in the cache line for a longer time.

Figure 14:
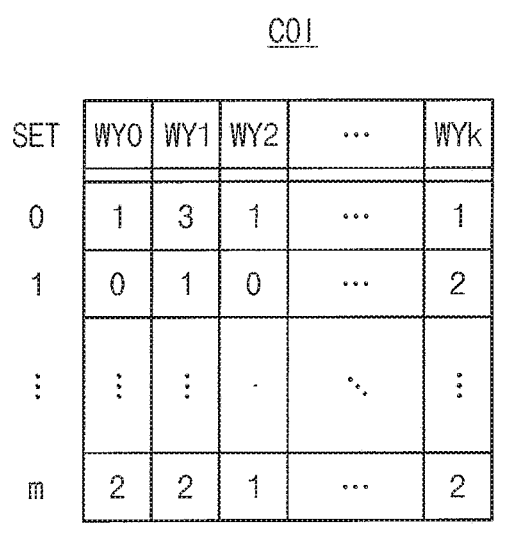

FIG. 14 is a diagram illustrating cache occupation information stored in a cache memory device according to an exemplary embodiment of the inventive concept.

The control logic circuit 31 in FIG. 5 may store the cache occupation information COI as illustrated in FIG. 14. The cache occupation information COI may include identifiers of processors corresponding to data stored in a plurality of cache lines. FIG. 14 illustrates example numbers of the processors related to the data respectively stored in a plurality of sets (SET=0~m) and a plurality of ways WY0~WYk. For example, the data stored by a processor having the processor number "1" are stored in the set (SET=0) and the set WY0. The control logic circuit 31 may determine the victim identifier PIDv included in the eviction information based on the cache occupation information COI.

Figure 15:
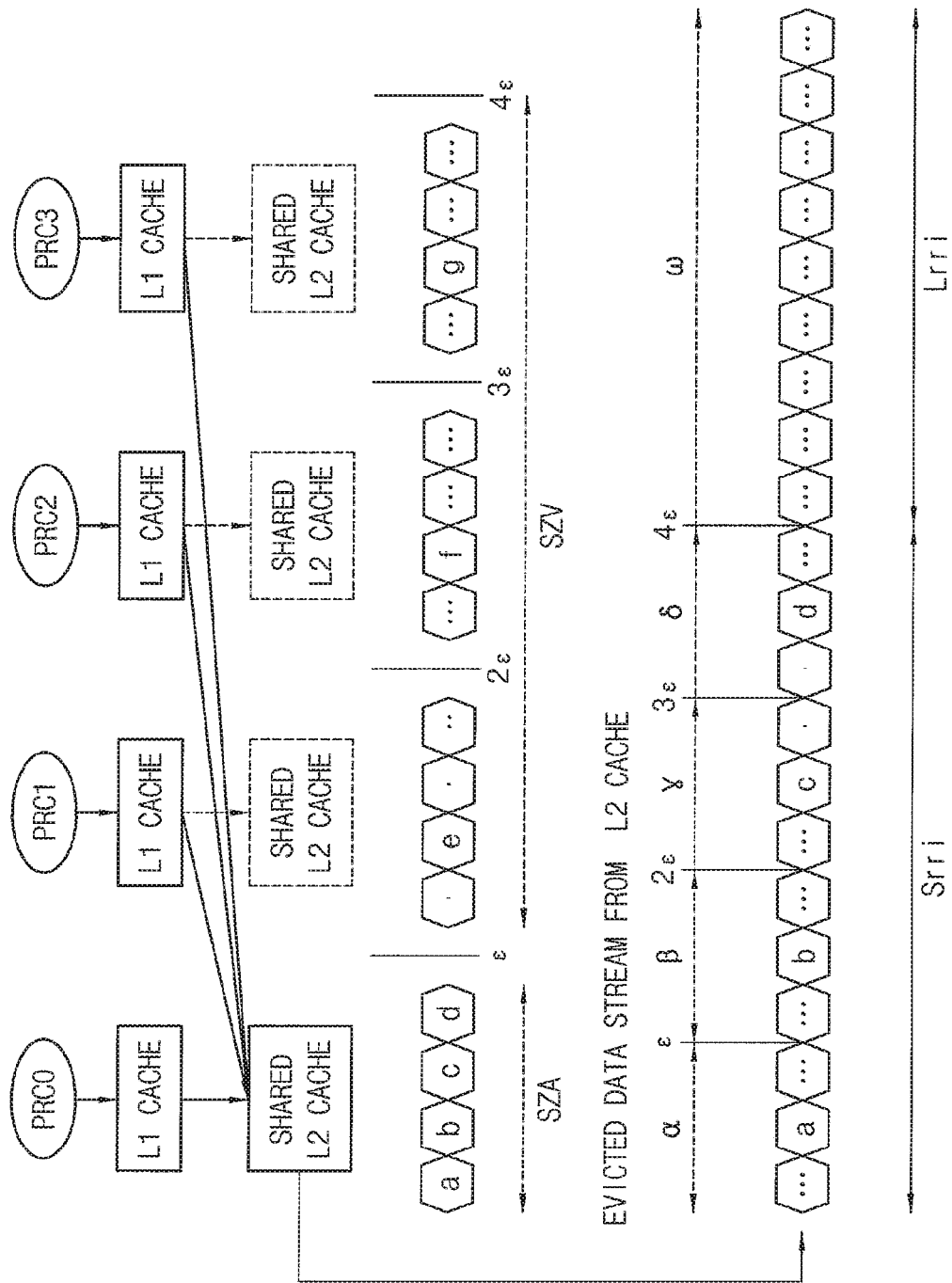
FIG. 15 is a diagram illustrating a valid re-reference interval of a cache memory device according to an exemplary embodiment of the inventive concept.

FIG. 15 is a diagram illustrating a valid re-reference interval of a cache memory device according to an exemplary embodiment of the inventive concept.

FIG. 15 illustrates an example data stream of data evicted sequentially from L1 caches respectively dedicated to four processors PRC0~PRC3 and L2 cache shared by the four processors PRC0~PRC3. For example, the data "a", "b", "c", and "d" correspond to the cache data stored in the L2 cache by the processor PRC0 and the data "e", "f", and "g" correspond to the data stored in the L2 cache by the processors PRC1, PRC2, and PRC3. In FIG. 15, SZA corresponds to data of a number "ε" and indicates an actually available cache size. SZV corresponds to data of a number "3ε" and indicates a virtually extended cache size.

In the evicted data stream, the evicted data included in subsets α, β, γ, and δ are evicted within a short re-reference interval Srri, and the evicted data included in a subset w are evicted within a long re-reference interval Lrri. If the evicted data during the short re-reference interval Srri are written again in the L2 cache, it indicates that the data having a high probability of reuse are deleted and written again inefficiently. According to exemplary embodiments of the inventive concept, the valid re-reference interval corresponding to the short re-reference interval Srri may be set properly and the shield information SHD may be generated to reduce the probability of evicting the protection data that may be reused with the valid re-reference interval Srri, thus enhancing performance of a system including a cache memory device.

In exemplary embodiments of the inventive concept, in case of a shared L2 cache memory device, the valid re-reference interval Srri may be set as Expression 1.

$$Srri = n*R*\varepsilon \text{ or } n*\varepsilon,$$

$$R = m2/m1 \qquad \text{Expression 1}$$

In Expression 1, n indicates a number of processors commonly accessing the shared L2 cache memory device, ε indicates a number of ways of the shared L2 cache memory device, m1 indicates a number of sets of a private L1 cache memory device, and m2 indicates a number of sets of the shared L2 cache memory device. As such, the valid re-reference interval, e.g., the number of the evicted data managed by the above-described auxiliary inference buffer AIB, may be determined based on a multiplication of the number n of the processors commonly accessing a shared cache memory device and the number ε of ways of the shared cache memory device.

FIG. 16 is a diagram illustrating way prediction windows stored in a cache memory device according to an exemplary embodiment of the inventive concept.

The control logic circuit 31 in FIG. 5 may store a plurality of way prediction windows WPW0~WPWn as illustrated in FIG. 16. The plurality of way prediction windows WPW0~WPWn correspond to a plurality of processors PRC0~PRCn and includes entries corresponding to a plurality of sets (SET=0~m), respectively.

Each entry of the plurality of way prediction windows WPW0~WPWn indicates a number of candidate ways corresponding to each of the plurality of processors PRC0~RPCn and each of the plurality of sets (SET=0~m). For example, the way prediction window corresponding to the processor PRC0 and the set (SET=0) may be 4.

The plurality of way prediction windows may be updated on the fly per cache access operation based on the plurality of diagnosis bit pairs stored in the differential diagnosis register as described above. The update of the way prediction window will be described below with reference to FIG. 17.

The control logic circuit 31 may determine the candidate ways corresponding to the processor and the set corresponding to the current cache access operation based on the plurality of way prediction windows as described with reference to FIG. 16 and the priority information as described with reference to FIG. 12.

Figure 17:
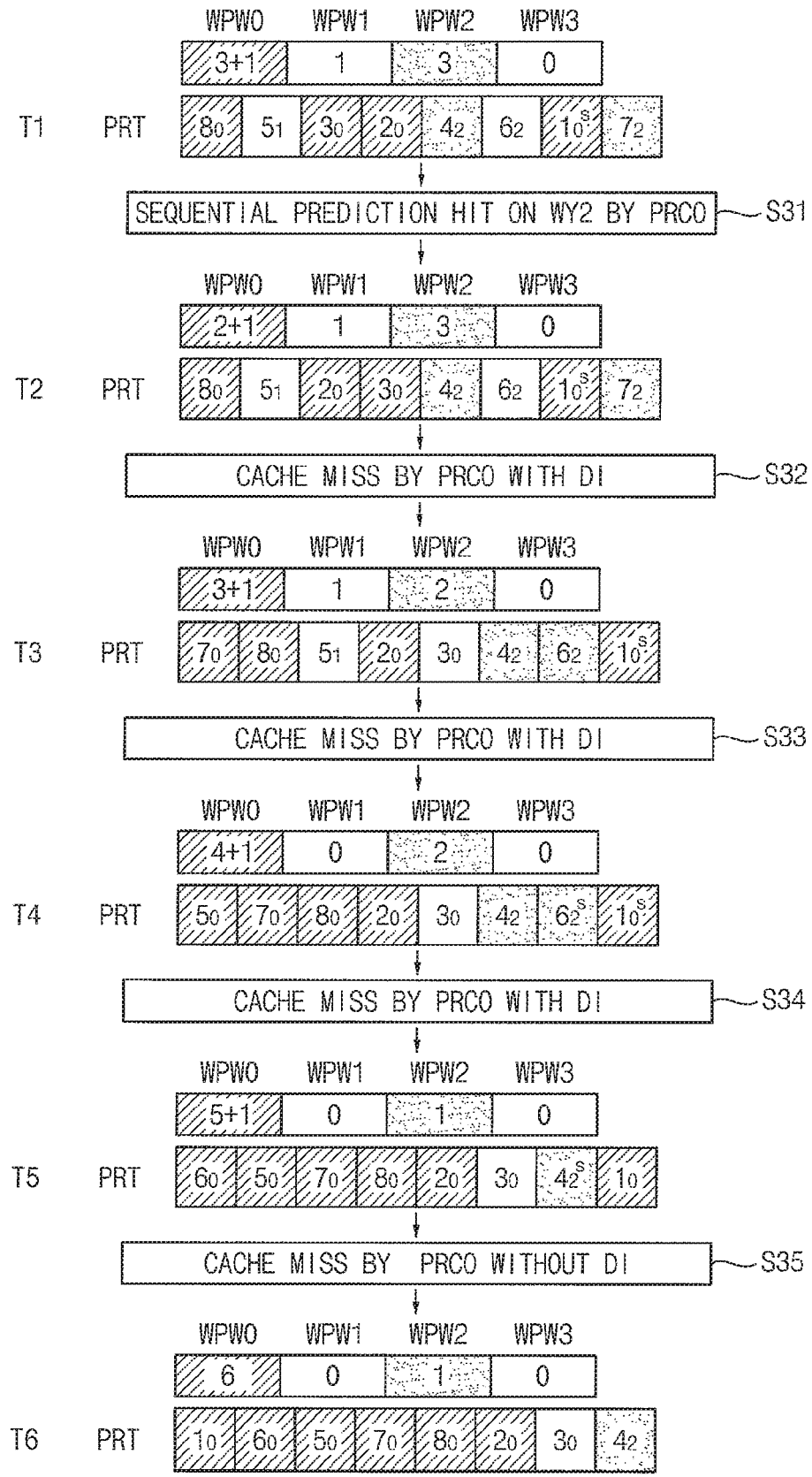
FIG. 17 is a diagram illustrating a priority update operation of a cache memory device according to an exemplary embodiment of the inventive concept.

FIG. 17 is a diagram illustrating a priority update operation of a cache memory device according to an exemplary embodiment of the inventive concept.

FIG. 17 illustrates example access results S31~S35 and update processes of the way prediction windows WPW0~WPW3 and the priority information PRT with respect to one set in the case of a shared cache memory device commonly accessed by four processors PRC0~PRC3 and including eight ways WY0~WY7. The notation of the priority information PRT is the same as described with reference to FIG. 12. "s" in "$1_0$" indicates the shield information such that the data in the corresponding cache line are the protection data as described above.

At a first time point T1, the first through fourth way prediction windows have values of 3+1=4, 1, 3, and 0, as an example. The first way prediction window WPW0 has an original value of 3 and the value may be increased from 3 to 4 by 1 because the cache line storing the protection data exists.

After the first time point T1, sequential way prediction hits (e.g., two consecutive way prediction hits) may occur on the third way WY2 by the first processor PRC0 (S31). The control logic circuit 31 in FIG. 5 may obtain such access results based on the diagnosis bit pairs as described above. The control logic circuit 31 may update the priority information PRT at a second time point T2 by decreasing the value of the first way prediction window WPW0 by 1 and increasing the priority of the third way WY2 corresponding to the sequential way prediction hits by 1.

After the second time point T2, a cache miss may occur by the first processor PRC0 and a destructive interference (DI) may occur such that the cache data in the eighth way WY7 that has been occupied by the third processor PRC2 are evicted (S32). In this case, the value of the interference bit DI in the eviction information as described with reference to FIG. 13 may be set to 1. The control logic circuit 31 may update the priority information PRT at a third time point T3 by increasing the value of the first way prediction window WPW0 corresponding to the cache miss by 1, decreasing the value of the third way prediction window WPW2 corresponding to the evicted data by 1, and set the eighth way WY7, in which the new cache data are written, to the highest priority.

After the third time point T3, a cache miss may occur by the first processor PRC0 and a destructive interference (DI) may occur such that the cache data in the sixth way WY5 that has been occupied by the second processor PRC1 are evicted (S33). The control logic circuit 31 may update the priority information PRT at a fourth time point T4 by increasing the value of the first way prediction window WPW0 corresponding to the cache miss by 1, decreasing the value of the second way prediction window WPW1 corresponding to the evicted data by 1, and set the sixth way WY5, in which the new cache data are written, to the highest priority.

After the fourth time point T4, a cache miss may occur by the first processor PRC0 and a destructive interference (DI) may occur such that the cache data in the seventh way WY6 that has been occupied by the third processor PRC2 are evicted (S34). The control logic circuit 31 may update the priority information PRT at a fifth time point T5 by increasing the value of the first way prediction window WPW0 corresponding to the cache miss by 1, decreasing the value of the third way prediction window WPW2 corresponding to the evicted data by 1, and set the seventh way WY6, in which the new cache data are written, to the highest priority.

The cache data in the second way WY1 corresponding to the lowest priority may be evicted according to a conventional cache replacement policy, but the cache data in the second way WY1 may correspond to the protection data according to a new cache replacement policy according to an exemplary embodiment of the inventive concept. In this case, the protection data in the second way WY1 may be prevented from being deleted and the cache data in the seventh way WY6 may be evicted instead of the protection data. After such protection, the cache data in the second way WY1 may be released from the protection data.

After the fifth time point T5, a cache miss may occur by the first processor PRC0 and the cache data that has been occupied by the first processor PRC0 may be evicted without the destructive interference (S35). The control logic circuit 31 may update the priority information PRT at a sixth time point T6 by increasing the value of the first way prediction window WPW0 corresponding to the cache miss by 1, and set the second way WY1, in which the new cache data are written, to the highest priority.

Hereinafter, exemplary embodiments are described with reference to FIGS. 18, 19, and 20 for a case where a private cache memory device is accessed dedicatedly by a single processor PRC0.

FIG. 18 is a diagram illustrating a differential diagnosis register included in a cache memory device according to an exemplary embodiment of the inventive concept, and FIG. 19 is a diagram illustrating a way rank buffer included in a cache memory device according to an exemplary embodiment of the inventive concept.

Referring to FIG. 18, the differential diagnosis register DDR may include a single diagnosis block 61. The signal diagnosis block 61, with respect to the single processor PRC0 and each of the plurality of sets (SET=0~m), may store accumulation information by accumulating a plurality of diagnosis bit pairs P1~Ps during a plurality of previous cache access operations. Descriptions of other elements are substantially the same as described with reference to FIG. 11, and repeat descriptions are omitted.

The control logic circuit 31 in FIG. 5 may generate the candidate way signal SCW corresponding to the single processor PRC0 and a set related with the current cache access operation based on the plurality of diagnosis bit pairs P1~Ps stored in the differential diagnosis register DDR.

Referring to FIG. 19, the way rank buffer WRB, with respect to the single processor PRC0 and each of the plurality of sets (SET=0~m), may store priority information indicating an order that the plurality of ways are included in the candidate ways. In comparison with the notation of the priority information PRT in FIG. 12 in the case of the shared cache memory device, each entry of the priority information PRT in FIG. 19 in the case of the private cache memory device may not include the processor number and include only the way number. Other descriptions are substantially the same as described with reference to FIG. 12, and repeat descriptions are omitted.

The control logic circuit 31 in FIG. 5 may update the priority information PRT on the fly per cache access operation based on the plurality of diagnosis bit pairs P1~Ps stored in the way rank buffer WRB of FIG. 19.

Figure 20:
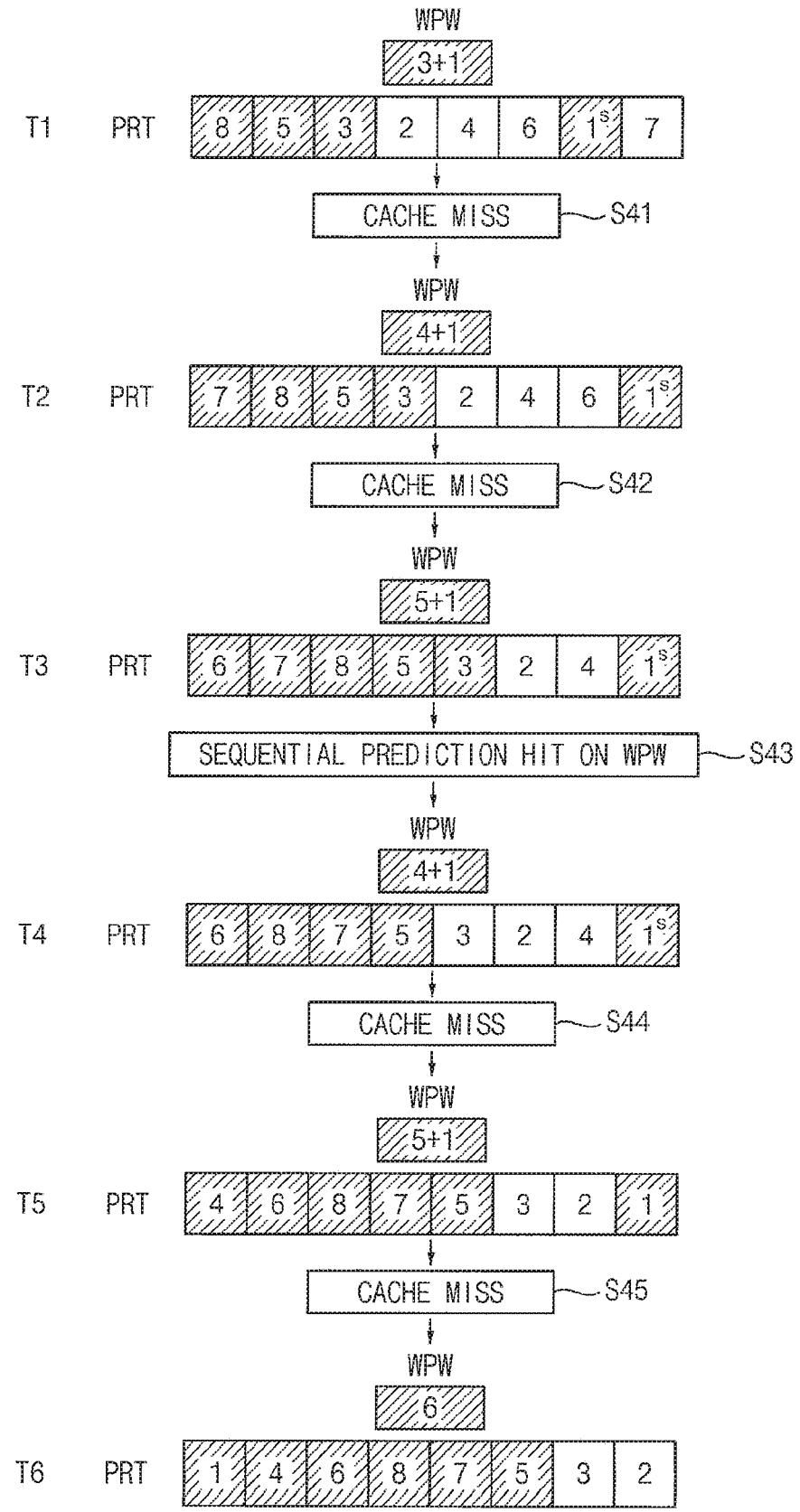
FIG. 20 is a diagram illustrating a priority update operation of a cache memory device according to an exemplary embodiment of the inventive concept.

FIG. 20 is a diagram illustrating a priority update operation of a cache memory device according to an exemplary embodiment of the inventive concept.

FIG. 20 illustrates example access results S41~S45 and update processes of the way prediction window WPW and the priority information PRT with respect to one set in the case of a private cache memory device dedicatedly accessed by a signal processor and including eight ways WY0~WY7. The update processes in FIG. 20 are substantially the same as those of FIG. 17 except for the destructive interference, and repeat descriptions are omitted.

As illustrated in FIG. 20, the value of the way prediction window WPW may be increased by 1 in the case of a cache miss, and decreased by 1 in the case of sequential way prediction hits.

Figure 21:
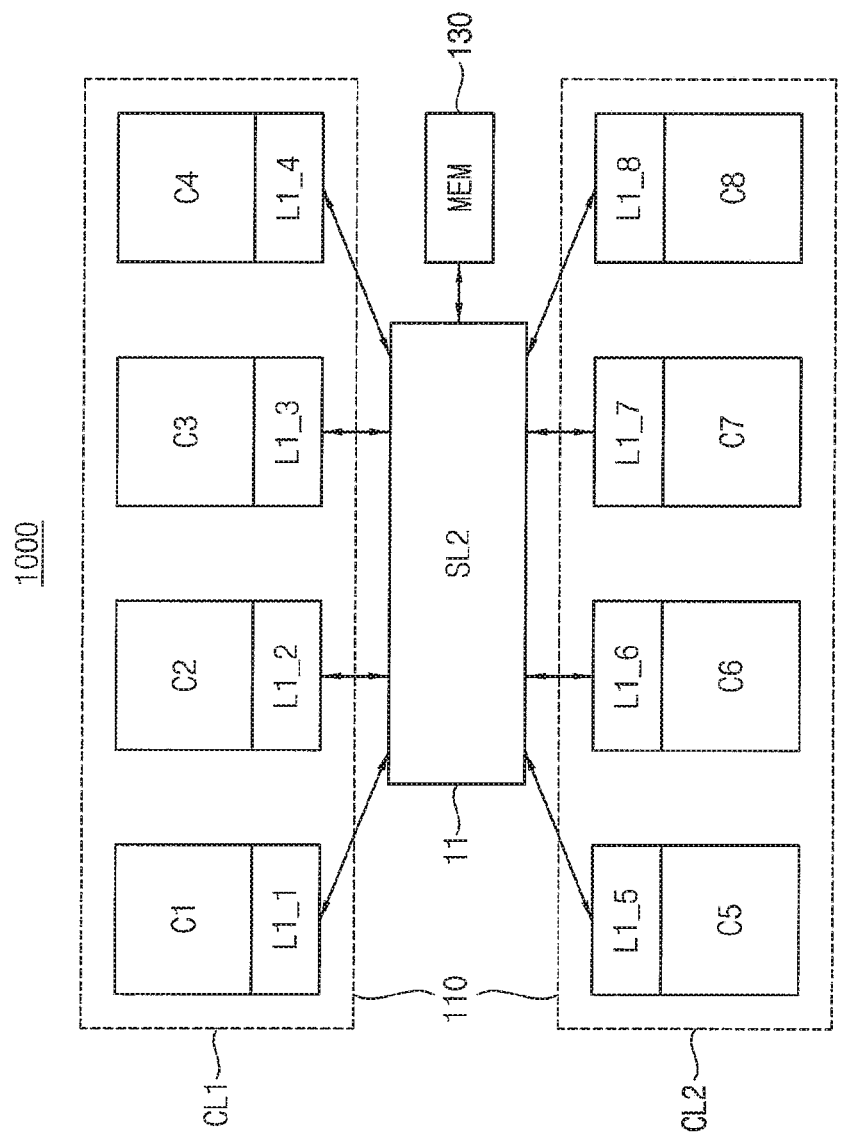
FIG. 21 is a block diagram illustrating a system according to an exemplary embodiment of the inventive concept.

FIG. 21 is a block diagram illustrating a system according to an exemplary embodiment of the inventive concept.

Referring to FIG. 21, a system 1000 may include a multi-core processor 110, a shared L2 cache memory device SL2 11, and a main memory MEM 130. FIG. 21 illustrates only the components for describing exemplary embodiments of the inventive concept, and the system 1000 may further include various other components.

The multi-core processor 110 may be implemented as a system-on-chip that may be included in various computing devices. The multi-core processor 110 may transmit and receive data and task requests to and from a host device through an interface (e.g., an interface circuit). The multi-core processor 110 may include a plurality of processor cores C1~C8 and a plurality of private L1 cache memory devices L1_1~L1_8 dedicatedly accessed by the plurality of processor cores C1~C8. While FIG. 21 illustrates eight processor cores C1~C8, the inventive concept is not limited to a specific number of processor cores.

The processor cores C1~C8 may be either homogeneous processor cores or heterogeneous processor cores. When the processor cores C1~C8 are homogeneous processor cores, each core is the same type. When the processor cores C1~C8 are heterogeneous processor cores, some of the cores are different types.

When the processor cores C1~C8 are heterogeneous processor cores, they may be sorted into a first cluster CL1 and a second cluster CL2. Among the processor cores C1~C8, the first cluster CL1 may include high-performance cores C1~C4 having a first processing speed, and the second cluster CL2 may include low-performance cores C5~C8 having a second processing speed that is smaller than the first processing speed.

At least one of the shared L2 cache memory device 11 and the plurality of private L1 cache memory devices L1_1~L1_8 may be implemented as the cache memory device capable of performing efficient way prediction according to exemplary embodiments of the inventive concept.

As described above, the cache memory device, the system including the cache memory device, and the method of operating the cache memory device according to exemplary embodiments of the inventive concept may reduce power consumption of the cache memory device and the system by exactly predicting the candidate ways based on the accumulation information. In addition, the cache memory device, the system including the cache memory device, and the method of operating the cache memory device according to exemplary embodiments of the inventive concept may reduce power consumption and enhance performance of the cache memory device and system by increasing the cache hit ratio and way prediction hit ratio based on the shield information on the protection data having high probability of reuse.

The inventive concept may be applied to a cache memory device and any devices and systems including a cache memory device. For example, the inventive concept may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

While the inventive concept has been shown and described with reference to exemplary embodiments thereof, it will be apparent to those of ordinary skill in the art that various modifications in form and details may be made thereto without departing from the spirit and scope of the inventive concept as set forth by the appended claims.

What is claimed is:

1. A cache memory device comprising:
a cache circuit including a plurality ways, wherein each of the plurality of ways includes a plurality of cache lines corresponding to a plurality of sets, and the cache circuit is configured to generate a cache hit signal indicating whether target data corresponding to an access address are stored in the plurality of cache lines and configured to perform a current cache access operation with respect to candidate ways among the plurality of ways based on a candidate way signal indicating the candidate ways in a way prediction mode; and
a way prediction circuit configured to store accumulation information by accumulating a cache hit result indicating whether the target data are stored in one of the plurality of ways and a way prediction hit result indicating whether the target data are stored in one of the candidate ways based on the cache hit signal provided during a plurality of previous cache access operations, and configured to generate the candidate way signal by determining the candidate ways for the current cache access operation based on the accumulation information in the way prediction mode.

2. The cache memory device of claim 1, wherein the way prediction circuit generates a prediction mode signal indicating enable or disable of the way prediction mode based on the accumulation information, and provides the prediction mode signal to the cache circuit.

3. The cache memory device of claim 2, wherein, when the prediction mode signal indicates the enable of the way prediction mode, the cache circuit perform a primary cache access operation with respect to the candidate ways, and performs a secondary cache access operation with respect to other ways except the candidate ways, among the plurality of ways, only when the target data are not stored in the candidate ways.

4. The cache memory device of claim 2, wherein, when the prediction mode signal indicates the disable of the way prediction mode, the cache circuit performs a normal cache access operation with respect to all of the plurality of ways.

5. The cache memory device of claim 1, wherein the cache memory device is a private cache memory device that is accessed dedicatedly by a single processor.

6. The cache memory device of claim 5, wherein the way prediction circuit includes:
a differential diagnosis register configured to, with respect to the single processor and each of the plurality of sets, store the accumulation information by accumulating a plurality of diagnosis bit pairs during the plurality of previous cache access operations, wherein each diagnosis bit pair includes a cache hit bit indicating the cache hit result and a way prediction hit bit indicating the way prediction hit result; and
a control logic circuit configured to generate the candidate way signal corresponding to the single processor and a set related with the current cache access operation based on the plurality of diagnosis bit pairs stored in the differential diagnosis register.

7. The cache memory device of claim 6, wherein the way prediction circuit further includes:
a way rank buffer configured to, with respect to the single processor and each of the plurality of sets, store priority information indicating an order that the plurality of ways are included in the candidate ways, and
wherein the control logic circuit updates the priority information on the fly per cache access operation based on the plurality of diagnosis bit pairs.

8. The cache memory device of claim 1, wherein the way prediction circuit includes:
an auxiliary inference buffer configured to store eviction information on evicted data that are replaced by new data and deleted from the plurality of cache lines during a valid re-reference interval.

9. The cache memory device of claim 8, wherein the way prediction circuit generates shield information on protection data based on the eviction information, and provides the shield information to the cache circuit, wherein the protection data indicates the evicted data that are written again in the cache line during the valid re-reference interval, and wherein the cache circuit prevents the protection data from being deleted from the cache line at least one time based on the shield information.

10. The cache memory device of claim 8, wherein the valid re-reference interval is determined based on a multiplication of a number of processors that commonly access the cache circuit and a number of the plurality of ways.

11. The cache memory device of claim 8, wherein the eviction information includes an address of the evicted data, a victim identifier indicating a processor that previously wrote the evicted data in the cache line, and an attacker identifier indicating a processor that deleted the evicted data from the cache line.

12. The cache memory device of claim 11, wherein the way prediction circuit stores cache occupation information indicating identifiers of processors corresponding to data stored in the plurality of cache lines and determines the victim identifier based on the cache occupation information.

13. The cache memory device of claim 1, wherein the cache memory device is a shared cache memory device that is accessed commonly by a plurality of processors.

14. The cache memory device of claim 13, wherein the way prediction circuit includes:
   a differential diagnosis register configured to, with respect to each of the plurality of processors and each of the plurality of sets, store the accumulation information by accumulating a plurality of diagnosis bit pairs during the plurality of previous cache access operations, wherein each diagnosis bit pair includes a cache hit bit indicating the cache hit result and a way prediction hit bit indicating the way prediction hit result; and
   a control logic circuit configured to generate the candidate way signal corresponding to a processor and a set related with the current cache access operation based on the plurality of diagnosis bit pairs stored in the differential diagnosis register.

15. The cache memory device of claim 14, wherein the way prediction circuit further includes:
   a way rank buffer configured to, with respect to each of the plurality of processors and each of the plurality of sets, store priority information indicating an order that the plurality of ways are included in the candidate ways.

16. The cache memory device of claim 15, wherein the control logic circuit updates the priority information on the fly per cache access operation based on the plurality of diagnosis bit pairs.

17. The cache memory device of claim 15, wherein the control logic circuit stores a plurality of way prediction windows corresponding to the plurality of processors and the plurality of sets, wherein each of the plurality of way prediction windows indicates a number of the candidate ways corresponding to each processor and each set, and the control logic circuit determines the candidate ways corresponding to a processor and a set related with the current cache access operation based on the plurality of way prediction windows and the priority information.

18. The cache memory device of claim 17, wherein the control logic circuit updates the plurality of way prediction windows on the fly per cache access operation based on the plurality of diagnosis bit pairs.

19. A system comprising:
   one or more processors;
   a main memory device configured to store data used by the one or more processors; and
   a cache memory device configured to store a portion of the data stored in the main memory device and configured to be accessed by the one or more processors before the one or more processors access the main memory device,
   wherein the cache memory device comprises:
   a cache circuit including a plurality ways, wherein each of the plurality of ways includes a plurality of cache lines corresponding to a plurality of sets, and the cache circuit is configured to generate a cache hit signal indicating whether target data corresponding to an access address are stored in the plurality of cache lines and configured to perform a current cache access operation with respect to candidate ways among the plurality of ways based on a candidate way signal indicating the candidate ways in a way prediction mode; and
   a way prediction circuit configured to store accumulation information by accumulating a cache hit result indicating whether the target data are stored in one of the plurality of ways and a way prediction hit result indicating whether the target data are stored in one of the candidate ways based on the cache hit signal provided during a plurality of previous cache access operations, and configured to generate the candidate way signal by determining the candidate ways for the current cache access operation based on the accumulation information in the way prediction mode.

20. A method of operating a cache memory device including a plurality of ways, each of the plurality of ways including a plurality of cache lines corresponding to a plurality of sets, the method comprising:
   generating a cache hit signal indicating whether target data corresponding to an access address are stored in the plurality of cache lines;
   storing accumulation information by accumulating a cache hit result indicating whether the target data are stored in one of the plurality of ways and a way prediction hit result indicating whether the target data are stored in one of candidate ways based on the cache hit signal provided during a plurality of previous cache access operations;
   generating a candidate way signal by determining the candidate ways for a current cache access operation among the plurality of ways based on the accumulation information in a way prediction mode; and
   performing the current cache access operation with respect to the candidate ways based on the candidate way signal in the way prediction mode.

* * * * *